US012780116B2

(12) United States Patent
Coufal

(10) Patent No.: US 12,780,116 B2
(45) Date of Patent: Nov. 3, 2026

(54) SLIDABLE BED LINER FOR VEHICLE AND METHOD OF USE

(71) Applicant: Steve A. Coufal, Omaha, NE (US)

(72) Inventor: Steve A. Coufal, Omaha, NE (US)

( * ) Notice: Subject to any disclaimer, the term of this patent is extended or adjusted under 35 U.S.C. 154(b) by 366 days.

(21) Appl. No.: 18/453,096

(22) Filed: Aug. 21, 2023

(65) Prior Publication Data

US 2025/0065821 A1 Feb. 27, 2025

(51) Int. Cl.
*B60R 13/01* (2006.01)
*B60R 9/06* (2006.01)
*F16B 5/00* (2006.01)

(52) U.S. Cl.
CPC ................ *B60R 13/01* (2013.01); *F16B 5/00* (2013.01); *B60R 9/06* (2013.01); *B60R 13/013* (2013.01); *B60R 2013/016* (2013.01)

(58) Field of Classification Search
CPC ......... B60R 13/01; B60R 9/06; B60R 13/013; B60R 2013/016; B60R 5/04; B60R 5/041; F16B 5/00
USPC ................ 224/511, 403, 404; 296/37.6, 39.2
See application file for complete search history.

(56) References Cited

U.S. PATENT DOCUMENTS 3,006,487 A * 10/1961 Gelli ......................... B60R 5/04 414/522
3,132,755 A 5/1964 Greenslate
4,772,165 A * 9/1988 Bartkus ..................... B60P 7/15 410/139
4,998,696 A * 3/1991 Desjardins ............. A47G 23/02 248/146
5,110,171 A 5/1992 Anthony
5,154,478 A * 10/1992 Erickson ................... B60P 1/64 296/39.2
5,469,999 A * 11/1995 Phirippidis ............... B60R 5/04 248/129
5,624,223 A 4/1997 Lovato
5,887,926 A * 3/1999 Kearney, Jr. ............ B60R 11/06 294/143
6,007,129 A * 12/1999 Kearney, Jr. ............ B60R 11/06 224/404
6,065,792 A 5/2000 Sciullo et al.
6,312,034 B1 11/2001 Coleman et al.
6,390,525 B2 5/2002 Carpenter et al.

(Continued)

FOREIGN PATENT DOCUMENTS

CA 2223306 A1 6/1999
WO WO-2018155780 A1 * 8/2018 ............. B60R 11/00

*Primary Examiner* — Carly W. Lynch
(74) *Attorney, Agent, or Firm* — McGrath North Mullin & Kratz, PC LLO; Luke C. Holst

(57) ABSTRACT

The present invention relates in general to motor vehicle accessories, and more specifically, to a slidable bed liner that assists with the loading, unloading, and storage of cargo in a cargo storage area of a motor vehicle. A purpose of the invention is to provide for an extension of the cargo storage area to eliminate the need to crawl into the vehicle to reduce the risk of slip and falls. The slidable bed liner includes a platform having a plurality of series of slots traversing therethrough, wherein each series of slots of the plurality is configured to attach a particular storage accessory using an attachment piece. The storage accessories may include, e.g., an accessory for storing long handled tools, an accessory for storing a bucket, various sized containers, a retaining barrier, or an accessory for storing a bicycle.

17 Claims, 15 Drawing Sheets

(56) References Cited

U.S. PATENT DOCUMENTS 6,460,744 B2 * 10/2002 Lance ........................ B60P 3/14
224/547
6,648,569 B2 11/2003 Douglass et al.
6,682,118 B2 * 1/2004 Ryan ........................ B60R 13/01
296/39.1
6,976,720 B1 12/2005 Bequette
7,083,219 B1 8/2006 Gregory
7,290,820 B1 * 11/2007 Smith ................... B60R 13/011
296/37.6
7,731,026 B2 * 6/2010 Harrison ................... B60R 7/00
206/349
7,794,003 B2 * 9/2010 Crandall ................... B60R 9/00
224/403
8,840,166 B1 9/2014 Derbes et al.
8,955,898 B2 2/2015 Bemis
9,073,487 B1 7/2015 Marshall
9,550,444 B1 * 1/2017 Ferreira .................. B60P 3/077
10,577,031 B2 3/2020 Crawford
10,829,059 B1 11/2020 Addison et al.
10,919,428 B2 2/2021 Wallace et al.
11,104,261 B2 * 8/2021 Westfall .................. F16B 21/09
11,124,247 B2 * 9/2021 Sosnowich ............ B62D 33/02
11,584,305 B2 * 2/2023 Kane ........................ B60R 11/06
12,221,071 B2 * 2/2025 Levine ..................... B60R 9/065
12,337,746 B1 * 6/2025 Phillips .............. B62D 33/0207
12,344,197 B2 * 7/2025 Rutman ................ B60P 7/0815
2002/0014505 A1 * 2/2002 Lance ........................ B60R 9/00
224/404
2002/0109368 A1 8/2002 Mink et al.
2002/0140245 A1 10/2002 Coleman et al.
2002/0153736 A1 10/2002 Goodyear
2004/0084491 A1 * 5/2004 Gibson ................... B60P 3/122
224/403
2007/0210599 A1 9/2007 Arnold
2008/0017648 A1 * 1/2008 Scott ...................... B65D 25/14
220/495.06
2008/0284181 A1 * 11/2008 Taylor .................... B65D 45/00
292/256
2009/0252585 A1 10/2009 Plaganis
2011/0037286 A1 * 2/2011 Nebel ..................... B60R 11/06
384/19
2012/0091694 A1 * 4/2012 Cha ......................... B62B 5/067
280/651
2012/0267404 A1 * 10/2012 Rottinghaus ............ B60R 9/065
224/547
2012/0286009 A1 * 11/2012 Forbis ....................... B60R 5/04
224/400
2012/0325877 A1 * 12/2012 Franks .................... B60R 11/06
224/404
2013/0001974 A1 1/2013 Alexander et al.
2013/0134195 A1 * 5/2013 Liddle ........................ B60R 9/06
224/404
2015/0093177 A1 * 4/2015 Morris ................... B62D 27/02
403/13
2016/0185268 A1 6/2016 Nachtman
2016/0214522 A1 7/2016 Marshall
2017/0043697 A1 2/2017 Wooden, Jr.
2017/0291554 A1 * 10/2017 Perez Astudillo ...... B60R 7/005
2018/0257576 A1 * 9/2018 Purvis .................... B65D 71/72
2020/0391645 A1 12/2020 Ieradi
2025/0074324 A1 * 3/2025 Rogerson .................. B60R 9/06

* cited by examiner

SLIDABLE BED LINER FOR VEHICLE AND METHOD OF USE

FIELD OF THE INVENTION

The present invention relates to motor vehicle accessories and, more particularly without limitation, to a slidable bed liner that assists with the loading, unloading, and storage of cargo in the cargo storage area of a motor vehicle.

BACKGROUND OF THE INVENTION

Consumers often select motor vehicles to purchase such as pickup trucks and sport utility vehicles ("SUVs"), primarily because of the convenience these vehicles provide in transporting large amounts of cargo from one location to another. For example even the lightest pickup trucks and SUVs have a payload capacity of approximately 1,000 pounds, which is typically more than enough for the average consumer to haul around their day-to-day needs. Because of their size and cargo volume capacity, pickup trucks and SUVs have accounted for 79% of the total market share of vehicles sold in the U.S. as recently as July 2023. See "Flash report, Automotive sales volume, 2023," published Aug. 2, 2023, available at available at marklines.com/en/statistics/flash_sales/automotive-sales-in-usa-by-month. (last visited Aug. 21, 2023).

Hauling cargo in the bed of a pickup truck or cargo storage area of an SUV, however, does have disadvantages. The inherent challenge is that vehicle owners often have difficulty storing and retrieving items from the cargo storage area. For instance, cargo is often placed towards the front of the cargo storage area to minimize damage caused by wind resistance or load shifting during transport. Consequently this requires owners to either climb up and into the cargo storage area to store or remove cargo therefrom, or awkwardly lean over the sides of the vehicle to do the same. Such difficulties are compounded by owners having a smaller stature, advanced age, or other physical ailments (e.g., bad back, knee pain) that often create significant safety concerns including slips, falls and related injuries. Such difficulties are further compounded when the cargo storage area is covered or includes a traditional bed liner having a high coefficient of friction, typically made of rubber. While traditional bed liners are often effective in keeping cargo stationary during transport, however, they do not typically allow for sliding cargo over the bed liner to easily load or unload cargo from the cargo storage area of the vehicle. Such traditional bed liners also do not allow for the bed liner to slide or extend out of the cargo storage area because they are often form fitted to the particular size and shape of the cargo storage area depending on the particular year, make, model and manufacturer of the vehicle.

For these reasons, various attempts have been made to incorporate metal frame ramps, tailgate extensions, or extendable truck bed platforms into the cargo storage area of the vehicle. These attempts all have a significant shortfall, however, in that they require invasive metal mounting mechanisms installed into the cargo storage area, the tailgate, or bumper of the vehicle. For example when installing a traditional extendable truck bed platform, holes must be drilled into the floor or walls of the vehicle cargo storage area and a base rigidly attached using bolts or other similar attachment mechanisms. The extendable platform is then mounted on the base using roller means to extend beyond the open cargo storage area for loading/unloading purposes. Such an approach still suffers disadvantages, however, as hardware is typically expensive to purchase and install, it permanently alters the body of the vehicle, and moreover raises the height of the bed of the cargo storage area making it more difficult when loading/unloading cargo as well as reducing the height capacity for covered beds. Further problems exist as the roller means are often susceptible to dirt and particulates that restrict movement of the extendable platform. The extendable truck bed platform may also limit use of the cargo storage area from carrying substantial loads that are over the capacity limit of the base and extendable platform, even though such loads are within the payload capacity of the vehicle. Because of their invasive mounting mechanisms, extendable truck bed platforms are customarily designed for particular years, makes, models, and manufacturers of pickup trucks, and are therefore not universal for use with other types of vehicles such as SUVs. For the same reasons extendable truck bed platforms limit a vehicle's uses as it cannot be easily removed after installation in the cargo storage area. Finally, such traditional extendable truck bed platforms often do not provide a solution for the restraint, organization and storage of cargo thereon which is also readily adaptable for protecting cargo of various types, sizes and configurations.

Thus what is needed is a slidable bed liner for the cargo storage area of a vehicle that provides for easy loading, unloading, and transport of cargo. What is further needed is a slidable bed liner for the cargo storage area of a vehicle that provides enhanced safety to the user by eliminating the need to crawl into the cargo storage area of the vehicle to reduce the risk of slip and falls. What is still further needed is a slidable bed liner for the cargo storage area of a vehicle that can be conveniently installed and removed without permanently altering the frame or body of the vehicle. What is also needed is slidable bed liner for the cargo storage area of a vehicle that is universally applicable to vehicles of different years, makes, models, and manufacturers. What is yet further needed is a slidable bed liner for the cargo storage area of a vehicle that provides for better organization, restraint and protection of a wide variety of cargo and uses.

SUMMARY OF THE INVENTION

The present disclosure solves the aforementioned issues by providing a slidable bed liner that includes a platform having a generally rectangular shape. The platform may include a bottom surface having a low coefficient of friction designed to slide along a top surface of a floor of the cargo storage area of the vehicle. The platform may further comprise a rear flap hingedly secured to a rear end of the platform that is designed to be folded up and compressed against a closed storage area of the vehicle to provide protection from shifting cargo during transport. At least one handhold may be positioned on the platform to assist a user with manipulating the platform into position in the cargo storage area. The platform may also include a plurality of series of slots traversing therethrough, wherein each series of slots of the plurality is configured to attach a particular storage accessory. The slidable bed liner may include a plurality of storage accessories, e.g., for storing long handled tools, for storing a bucket, various sized containers, a retaining barrier, or for storing a bicycle. The slidable bed liner may further include an attachment piece configured to removably attach the storage accessories to the platform through the plurality of series of slots traversing through the platform.

In further instances, a method of using a slidable bed liner to transport cargo in a vehicle may be provided. The method may include providing a vehicle having a cargo storage area and cargo in need of transport. The method may also include providing the slidable bed liner of the present disclosure. Depending on the cargo to be transported, a particular storage accessory may be selected. The storage accessory may be removably attached to the platform using attachment pieces. The method may further include setting the slidable bed liner in the cargo storage area of the vehicle. Cargo may next be loaded onto the slidable bed liner using the storage accessory to ensure reliable securement of the cargo. The cargo is then transported to a desired destination using the vehicle.

PRINCIPAL OBJECTS AND ADVANTAGES OF THE INVENTION

Therefore, it is a principal object, feature, and/or advantage of the present disclosure to overcome the aforementioned deficiencies in the art and provide a slidable bed liner for the cargo storage area of a vehicle that provides for easy loading, unloading, and transport of cargo.

Another object, feature, and/or advantage of the present disclosure is to provide a slidable bed liner for the cargo storage area of a vehicle that provides enhanced safety to the user by eliminating the need to crawl into the cargo storage area of the vehicle to reduce the risk of slip and falls.

Yet another object, feature, and/or advantage of the present disclosure is to provide a slidable bed liner for the cargo storage area of a vehicle that can be conveniently installed and removed without permanently altering the frame or body of the vehicle.

A further object, feature, and/or advantage of the present disclosure is to provide a slidable bed liner for the cargo storage area of a vehicle that is universally applicable to vehicles of different years, makes, models, and manufacturers.

A still further object, feature, and/or advantage of the present disclosure is to provide a slidable bed liner for the cargo storage area of a vehicle that provides for better organization, restraint and protection of a wide variety of cargo and uses.

Another object, feature, and/or advantage of the present disclosure is to provide a slidable bed liner for the cargo storage area of a vehicle that minimizes damage to the storage area from, e.g., dents, stains, or scratches.

Yet another object, feature, and/or advantage of the present disclosure is to provide a slidable bed liner for the cargo storage area of a vehicle that provides for an extension of the cargo space to assist with easier loading/unloading of cargo or use as an additional workspace.

A further object, feature, and/or advantage of the present disclosure is to provide a slidable bed liner for the cargo storage area of a vehicle that is cost efficient and economical to manufacture and produce.

A still further object, feature, and/or advantage of the present disclosure is to provide a slidable bed liner for the cargo storage area of a vehicle that is durable, lightweight, and convenient to use and operate.

Other objects, features, and advantages of this disclosure will become apparent from the following description taken in conjunction with the accompanying drawings wherein are set forth, by way of illustration and example and without limitation, certain aspects of this disclosure. The present disclosure is not to be limited to or by these objects, features, and advantages. No single aspect need provide each and every object, feature, or advantage. The scope of the present disclosure is intended to cover all such embodiments that may fall within the scope of the appended claims, either literally or under the doctrine of equivalents.

BRIEF DESCRIPTION OF THE DRAWING FIGURES

FIG. 1 is a top rear perspective view of a slidable bed liner as shown inside an open cargo storage area of a vehicle with a plurality of storage accessories removably attached.

FIG. 2 is a top plan view of a platform of the slidable bed liner of FIG. 1 as shown removed from the cargo storage area of the vehicle, the bottom plan view being a mirror image.

FIG. 3 is a top side perspective view of the slidable bed liner of FIG. 1 with a rear flap compressed against a closed cargo storage area of the vehicle.

FIG. 4 is a top side perspective view of the storage accessory of FIG. 1 for storing long handled tools.

FIG. 5 is a top side perspective view of the storage accessory of FIG. 1 for storing a bucket.

FIG. 6 is a top side perspective view of the storage accessories of FIG. 1 being small and large containers for storing various items.

FIG. 7 is a top rear perspective view of the storage accessory of FIG. 1 comprising a barrier for ensuring cargo remains on the slidable bed liner during use.

FIG. 8 is a top rear perspective view of the slidable bed liner of FIG. 1 configured to fit within the open cargo storage area of a vehicle with a removable bicycle storage accessory attached.

FIG. 9 is a top side perspective view of the bicycle storage accessory of FIG. 5 for storing a bicycle.

FIG. 10 is a bottom side perspective view of a corner attachment piece for removably attaching storage accessories to the slidable bed liner.

FIG. 11 is a top side perspective view of the corner attachment piece of FIG. 10 as shown removably attaching an exemplary storage accessory to a platform of the slidable bed liner.

FIG. 12 is a bottom side perspective view of a right side straight attachment piece for removably attaching storage accessories to the slidable bed liner.

FIG. 13 is a bottom side perspective view of a left side straight attachment piece for removably attaching storage accessories to the slidable bed liner.

FIG. 14 is a top side perspective view of an exemplary straight attachment piece of FIGS. 12, 12A, 13, 13A as shown removably attached to the platform of the slidable bed liner.

DETAILED DESCRIPTION OF THE INVENTION

Referring generally to FIGS. 1-17, the present disclosure is directed to a slidable bed liner 10 for a cargo storage area 12 of a vehicle 14 and a method of use. Particularly, FIGS. 1-15 are directed to the slidable bed liner 10 designed to fit in the cargo storage area of a standard pickup truck with or without a bed cover or a cargo van having a larger cargo storage area. FIG. 16 is directed to the slidable bed liner 10 designed to fit in the cargo storage area of an SUV or similarly sized pickup truck having a smaller cargo storage area. Both aspects of the slidable bed liner 10 are designed to provide for easy loading, unloading, and transport of cargo 20. While certain aspects of the present disclosure are shown and described herein, it is understood that such aspects are merely exemplary. The present disclosure is not intended to be limited to these specific aspects and may encompass other aspects or embodiments. Therefore, specific structural and functional details disclosed herein are not to be interpreted or inferred as limiting, but merely as a basis for the claims and as a representative basis for teaching one skilled in the art how to make and use the disclosed subject matter.

It must be noted that the singular terms "a," "an," and "the" as used herein may include plural referents unless the context clearly dictates otherwise. As used herein, in particular aspects, the terms "about" or "approximately" when preceding a numerical value indicates the value plus or minus a range of 0.1, 0.2, 0.3, 0.4 or 0.5 inch. In other aspects, the terms "about" or "approximately" when preceding a numerical value indicates the value plus or minus a range of 0.6, 0.7, 0.8, 0.9, or 1 inch. In other aspects, the terms "about" or "approximately" when preceding a numerical value indicates the value plus or minus a range of 1, 2, 3, 4, or 5 inches. Furthermore the transitional phrase "comprising" that is synonymous with "including," "containing," and "characterized by" as used herein is inclusive or open-ended and does not exclude additional, unrecited elements, steps or ingredients. Alternatively the transitional phrase "consisting of" as used herein is closed and excludes any element, step or ingredient not specified. The term "vehicle" as used herein collectively refers to all types of vehicles for transporting cargo, including, e.g., pickup trucks, cargo vans, and SUVs. The term "generally" or "substantially" as used herein is defined as being mostly but not necessarily wholly that which is specified. The term "larger" as used herein is defined as exceeding most other things of like kind especially in size. The term "smaller" as used herein is defined as having a comparatively little size or slight dimensions.

Figure 1:
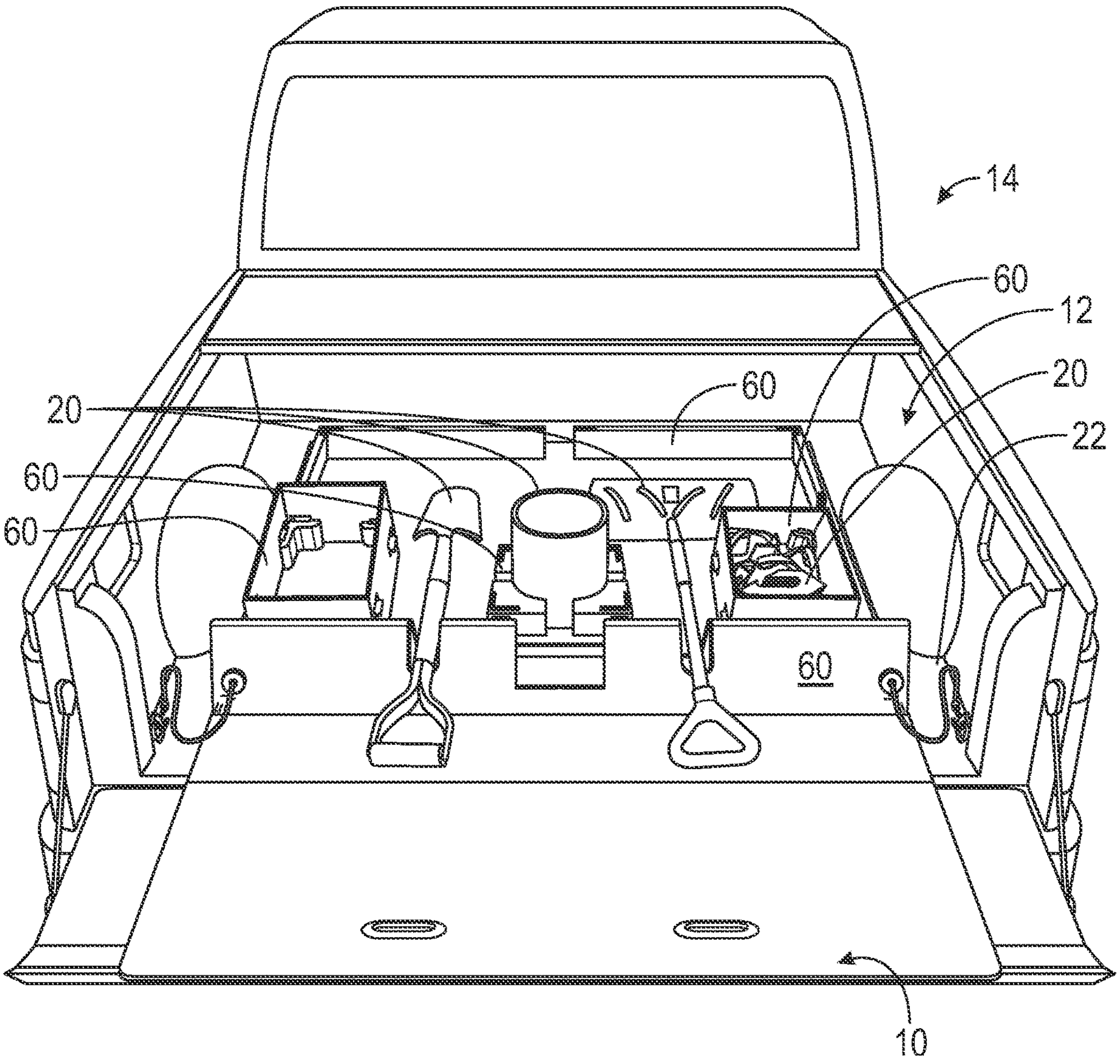
FIGS. 1-14 represent examples of a slidable bed liner of the present disclosure and a method of using the slidable bed liner.

FIG. 1 illustrates a top rear perspective view of the slidable bed liner 10 inside an open cargo storage area 12 of a vehicle 14 with a plurality of storage accessories removably attached. As a non-limiting example, the slidable bed liner 10 depicted in FIG. 1 is shown being compatible with a vehicle 14 such as a pickup truck or a cargo van having a larger cargo storage area 12. It is contemplated by the present disclosure that the slidable bed liner 10 is universally applicable to pickup trucks and cargo vans of different years, makes, models, and manufacturers. For example, the slidable bed liner 10 may be configured to fit various pickup truck bed sizes having: (i) a short bed typically between 5.5-6.5 feet long; (ii) a standard bed typically between 6-6.5 feet long; or (iii) a long bed typically between 6.5-8 feet long. Furthermore, the slidable bed liner 10 may be configured to fit various cargo vans having cargo storage areas that are typically between 8-12 feet long.

Shown in FIG. 1, the slidable bed liner 10 is designed to fit and substantially cover a floor 22 of the vehicle's cargo storage area 12. The slidable bed liner 10 does not require permanent alteration to the frame or body of the vehicle 14 for installation or removal. Rather, for installation the slidable bed liner 10 may be simply placed on a top surface of the floor 22 of the cargo storage area 12, and more specifically, between wheel wells of the vehicle 14. The slidable bed liner 10 may be slidably engaged with the top surface of the floor 22, wherein the slidable bed liner 10 is configured to smoothly slide in and out of the open cargo storage area 12 of the vehicle 14. The open cargo storage area 12 of the vehicle 14 may comprise, e.g., an open tailgate or an open rear door(s) of the vehicle 14. All manners of cargo 20, such as groceries, tools, bicycles, buckets, construction materials, moving boxes, etc., may be placed on top of the slidable bed liner 10 for transport in the cargo storage area 12 of the vehicle 14. To provide for easier loading/unloading of the cargo 20 from the cargo storage area 12, the slidable bed liner 10 may be slid out of the open cargo storage area 12 to provide for an extension of cargo space for convenient accessibility by a user or use as an additional workspace. For removal of the slidable bed liner 10 from the cargo storage area 12 after use, the slidable bed liner 10 may be simply lifted or slid out of the open cargo storage area 12 by the user and separately stored apart from the vehicle 14 until needed again for the transport of cargo 20 therein. For example, the slidable bed liner 10 may be stored by being hung on a wall using hooks through one or two handholds 54 of the slidable bed liner 10.

Figure 2:
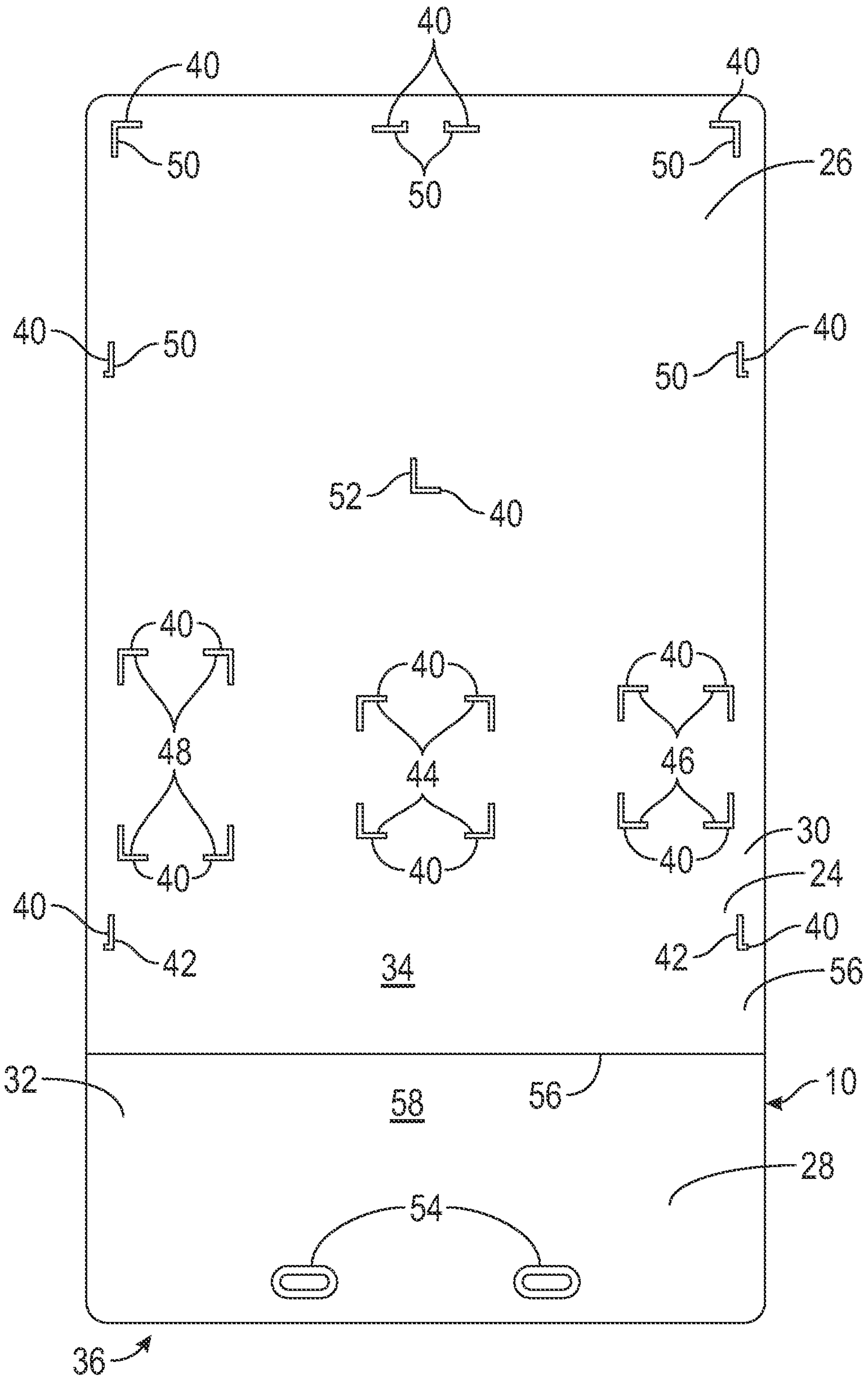

FIG. 2 illustrates a top plan view of the slidable bed liner 10 shown removed from the cargo storage area 12 of the vehicle 14, the bottom plan view being a mirror image. In particular, the slidable bed liner 10 may comprise a platform 24 formed from a single piece of flat, rigid material, such as but not limited to, corrugated cardboard, plastic polymers, high density polyethylene, polyvinyl chloride, nylon, or combinations thereof. The materials comprising the platform 24 are preferably lightweight to permit the user to install, manipulate, and remove the slidable bed liner 10 from the cargo storage area 12 of the vehicle 14 without requiring assistance. The materials comprising the platform 24 should also be durable to protect the vehicle's cargo storage area 12 from dents, scratches, stains, contaminants, or corrosion caused by cargo 20 transported therein, including the ability to withstand degradation from direct exposure to sunlight, chemicals, moisture, and environmental factors. Optionally, the durability qualities of the platform 24 may be enhanced by incorporating a spray-on or roll-on bonded exterior coating comprising, but not limited to, polyurethane/polyurea to further protect the slidable bed liner 10 from damage.

Shown in FIG. 2, the platform 24 comprises a generally rectangular shape configured and sized to fit inside the cargo storage area 12 of the vehicle 14. In other instances, the platform 24 may comprise a generally square shape. For example, depending on a particular year, make, model, and manufacturer of the vehicle 14, the platform 24 may range approximately 3-10 feet in length and 3-6 feet in width. The platform 24 may further have a uniform thickness ranging between approximately 0.250-1.250 inches to provide sufficient strength and rigidity to the slidable bed liner 10. The platform 24 may include a front end 26, a rear end 28, a right side 30, a left side 32, a top surface 34, and a bottom surface 36. In particular, the bottom surface 36 of the platform 24 should be substantially smooth to mitigate friction between the slidable bed liner 10 and the top surface of the floor 22 of the cargo storage area 12 of the vehicle 14, as the slidable bed liner 10 is slid in and out of the open cargo storage area 12. In some instances, the bottom surface 36 of the platform 24 may incorporate a spray-on or roll-on bonded exterior coating (not shown) comprising, but not limited to, products such as polyurethane/polyurea to further reduce friction between the slidable bed liner 10 and the top surface of the floor 22 and better facilitate ease of movement. The top surface 34 of the platform 24 should also be substantially smooth to facilitate the sliding of cargo 20 thereupon as cargo 20 is loaded or unloaded from the slidable bed liner 10. In some instances, the platform 24 may have rounded corners positioned between the front, rear ends 26, 28 and right, left sides 30, 32 to prevent the slidable bed liner 10 from catching on edges or sides of the cargo storage area 12 as the slidable bed liner 10 is being slid in and out of the open cargo storage area 12 of the vehicle 14. In other instances, the platform 24 may have square corners to provide for additional coverage and protection of the floor 22 of the cargo storage area 12.

Further shown in FIG. 2, the platform 24 may comprise a plurality of slots 40 for removably attaching storage accessories 60 to the platform 24 using attachment pieces 62. In some instances, each slot 40 of the plurality may be preformed during the manufacturing process of the platform 24. In other instances, each slot 40 of the plurality may comprise a perforated tab preformed during the manufacturing process of the platform 24. Specifically, the perforated tab may outline a periphery of the corresponding slot 40. The perforated tab may be punched out by the user to create the corresponding slot 40 through the platform 24. Certain slots 40 are utilized together as a series for removably attaching a particular storage accessory 60 to the platform 24. Each series of slots is unique to removably attach a particular storage accessory 60. For instance, the platform 24 may comprise a first series of slots 42 for removably attaching a first storage accessory for storing long handled tools 64. The platform 24 may further comprise a second series of slots 44 for removably attaching a second storage accessory for storing a bucket 66. The platform 24 may still further comprise a third series of slots 46 for removably attaching a third storage accessory being a small container 68. The platform 24 may yet further comprise a fourth series of slots 48 for removably attaching a fourth storage accessory being a large container 70. The platform 24 may also comprise a fifth series of slots 50 for removably attaching a fifth storage accessory being a barrier 72 to ensure cargo remains on the slidable bed liner 10 during use. The platform 24 may comprise a sixth series of slots 52 for removably attaching a bicycle storage accessory 124. Therefore, in instances where the slots 40 comprise perforated tabs, the user may select certain tabs to be punched out to create a particular series of slots 42, 44, 46, 48, 50, 52 for attaching a corresponding storage accessory (not shown) depending on the requirements of the user. Other tabs of series of slots 42, 44, 46, 48, 50, 52 that are not needed by the user may be allowed to remain in the platform 24 with their corresponding slots closed.

Still further shown in FIG. 2, the platform 24 may comprise at least one handhold 54 positioned towards the rear end 28 of the platform 24. The handhold 54 is configured to allow the user to grip the platform 24 and push, pull, or otherwise manipulate the slidable bed liner 10 in and out of the open cargo storage area 12 of the vehicle 14. The handhold 54 is designed to remain flush with the top surface 34 of the platform 24 to prevent cargo 20 from catching thereon during use. The handhold 54 is also designed to remain flush with the bottom surface 36 of the platform 24 to prevent the floor 22 of the cargo storage area 12 from catching on the handhold 54 as the slidable bed liner 10 slides in and out of the open cargo storage area 12 of the vehicle 14. Depicted in FIG. 2, the handhold 54 may comprise an opening through the platform 24 with half a handle inserted into the opening from the top surface 34 of the platform 24 and another half a handle inserted into the opening from the bottom surface 36 of the platform 24, wherein the two half handles connect and lock together to form a complete handle 54. However, it is contemplated by the present disclosure that other types of handholds 54 may also be utilized such as, e.g., collapsible pull handles, foldup knobs, rope handles, foldaway cup handles, and strap handles.

Yet further shown in FIG. 2, the platform 24 may comprise at least one crease line 56 to facilitate the bending or folding of the slidable bed liner 10 along the crease line 56. In other instances, the crease line 56 may comprise a hinge that provides similar functionality. The crease line 56 may be positioned approximately 15-25 inches from the rear end 28 of the platform 24 and traverse the width of the slidable bed liner 10. The crease line 56 is designed to form a rear flap 58 that may be folded up and compressed against a closed cargo storage area 12 of the vehicle 14. The closed cargo storage area 12 of the vehicle 14 may comprise, e.g., a closed tailgate or a closed rear door(s) of the vehicle 14. The rear flap 58 may comprise the at least one handhold 54 positioned thereon.

Figure 3:
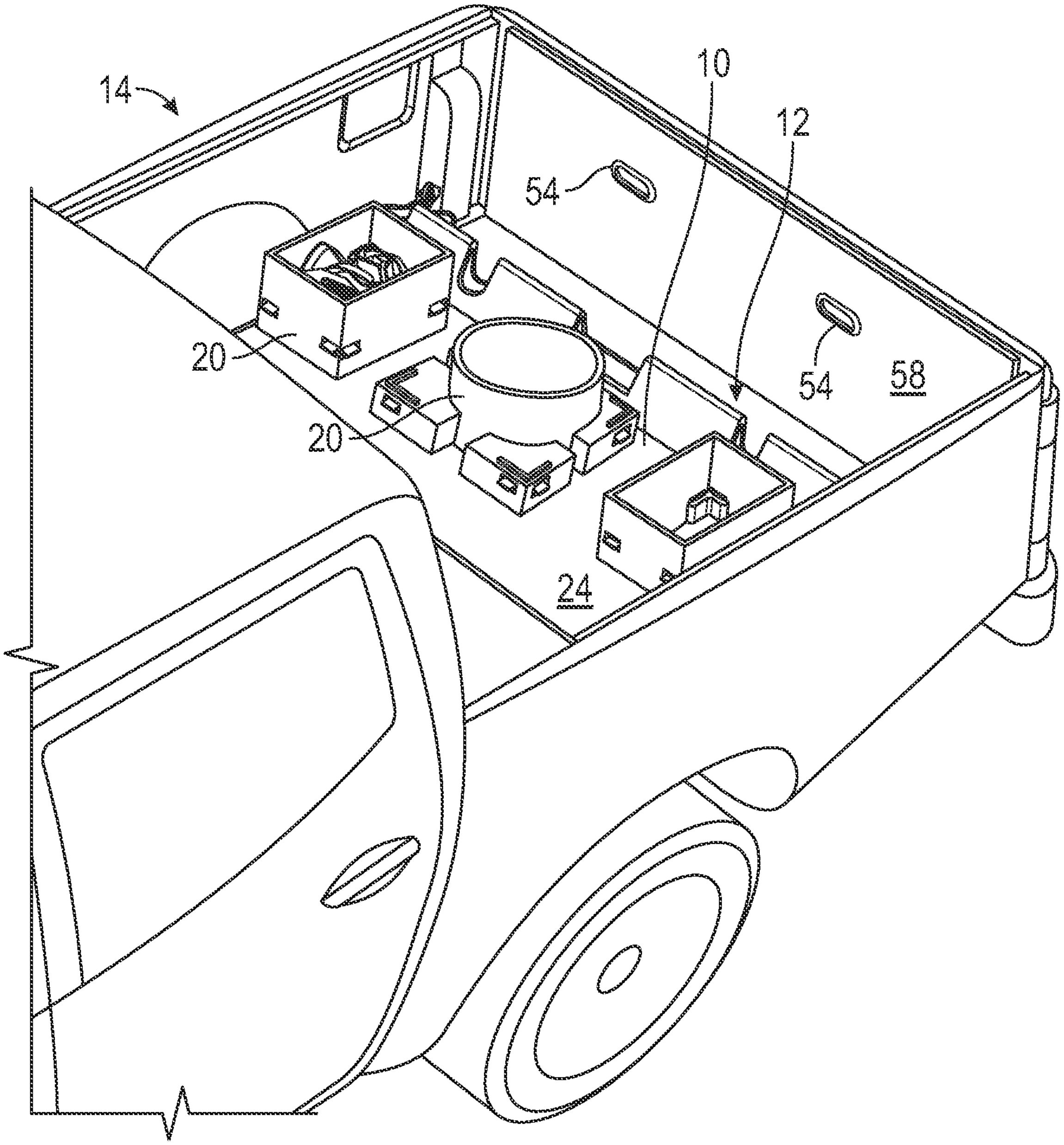

FIG. 3 illustrates a top side perspective view of the rear flap 58 of the platform 24 of the slidable bed liner 10 compressed against the closed cargo storage area 12 of the vehicle 14. In particular, the rear flap 58 is designed to fold up and press against the tailgate or rear door of the vehicle 14 to protect it from damage that may be caused by the shifting and movement of cargo 20 during transport by the vehicle 14. After the vehicle 14 reaches its destination, the tailgate or rear door of the vehicle 14 may be opened and the rear flap 58 of the platform 24 lowered. The user may next grasp the at least one handhold 54 on the rear flap 58 to pull or otherwise manipulate the slidable bed liner 10 out of the open cargo storage area 12 of the vehicle 14 to facilitate unloading of the cargo 20.

Figure 4:
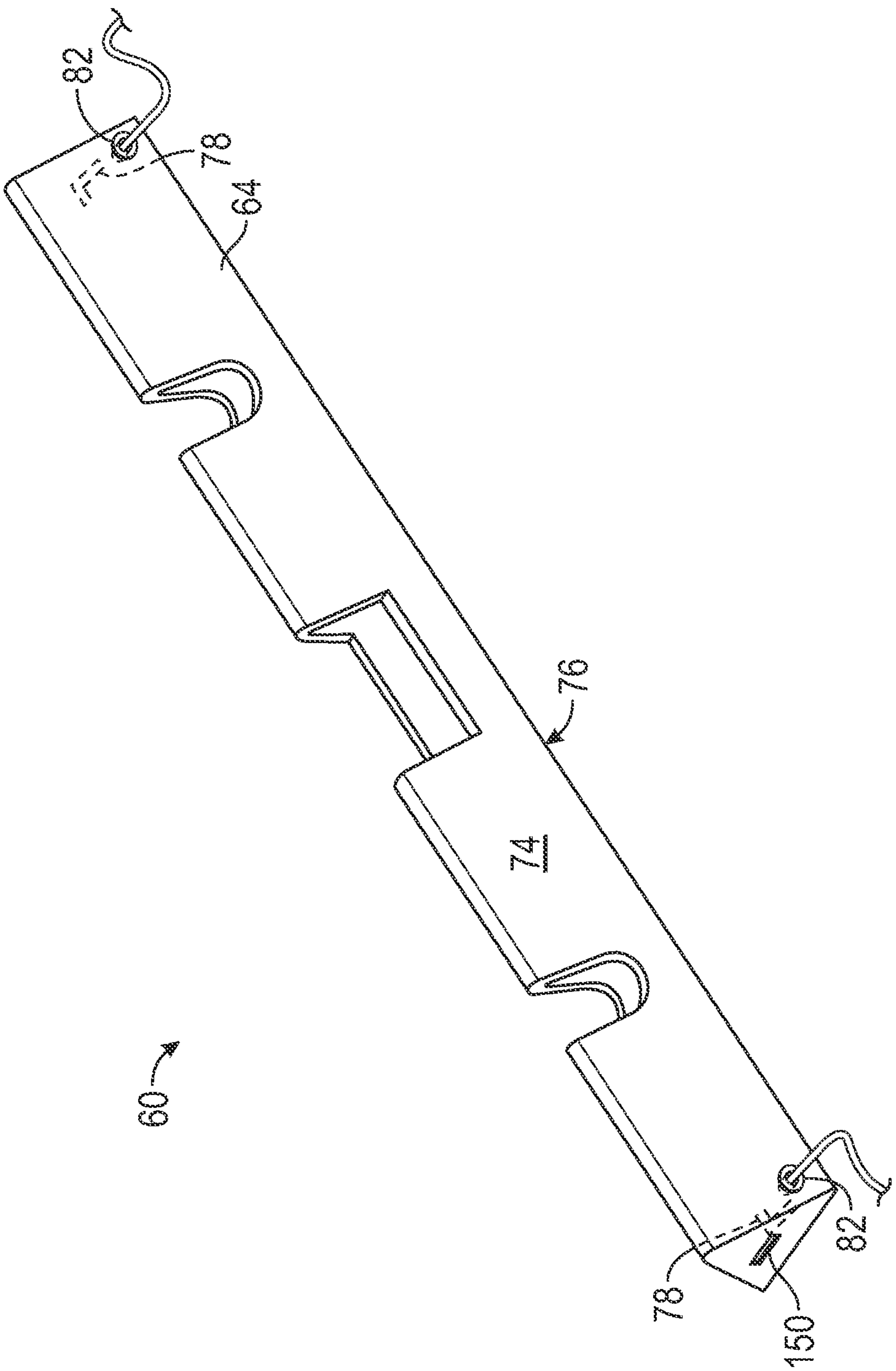

FIG. 4 illustrates a top side perspective view of the first storage accessory 64 for storing long handled tools as shown removed from the platform 24 of the slidable bed liner 10. As non-limiting examples, the first storage accessory 64 may be used to store tools, such as but not limited to, rakes, shovels, garden hoes, powered string trimmers, brooms, lawn care accessories, hand tools, and power tools. The first storage accessory 64 may comprise a hollow, elongated tube extending approximately the width of the platform 24, or alternatively, approximately 2-6 inches shorter than the width of the platform 24. In other instances the first storage accessory 64 may be formed of a solid material. As depicted in FIG. 4A, the elongated tube comprises a triangular shape having a triangular top surface 74 and a flat bottom surface 76. It is contemplated by the present disclosure, however, that other tubular shapes having a flat bottom surface may also be utilized (e.g., square tubes, rectangular tubes, and flat-sided oval tubes). It is further contemplated by the present disclosure that the elongated tube may be formed of a solid, durable, lightweight material such as, but not limited to, Styrofoam, resin formations, plastic polymers, high density polyethylene, polyvinyl chloride, polylactic acid, acrylonitrile butadiene styrene, thermoplastic polyurethane, or combinations thereof. To removably attach the first storage accessory 64 to the platform 24, the first storage accessory 64 may comprise a series of slots 78 traversing through the bottom surface 76. The series of slots 78 of the first storage accessory 64 should correspond with the first series of slots 42 in the platform 24. Attachment pieces 62 may be utilized to traverse through both series of slots 42, 78 to removably attach the first storage accessory 64 to the platform 24 of the slidable bed liner 10. In particular, the bottom surface 76 of the first storage accessory 64 may rest upon and be removably secured to the top surface 34 of the platform 24. The first storage accessory 64 may additionally comprise grooves 80 positioned on the top surface 76, wherein the grooves 80 are configured to seat handles of long handled tools and maintain them in a fixed position during transport. The first storage accessory 64 may also include eyelets 82 positioned on each end of the elongated tube. The eyelets 82 may be used to connect tie down straps to the first storage accessory 64 and the cargo storage area 12 to provide further stability to the slidable bed liner 10 as it is being utilized to transport cargo 20.

Figure 5:
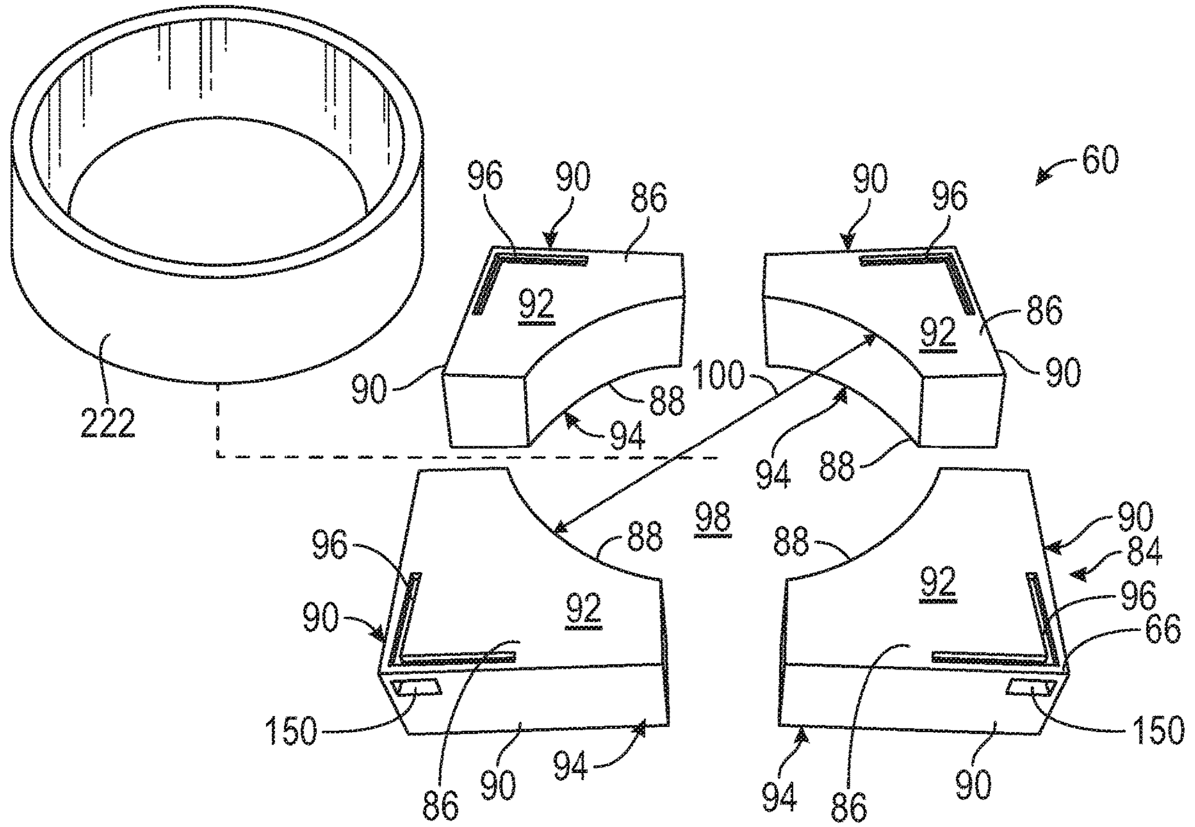

FIG. 5 illustrates a top side perspective view of one aspect 84 of the second storage accessory 66 for storing a bucket as shown removed from the platform 24 of the slidable bed liner 10. The second storage accessory 66 may comprise at least four individual corner pieces 86, wherein each corner piece 86 includes a curved interior wall 88, at least two exterior walls 90, a top surface 92, and a flat bottom surface 94. Each corner piece 86 may measure approximately 4-6 inches in length, approximately 2-6 inches in height, and approximately 4-6 inches in width. In other instances, the four corner pieces 86 may be attached by intermediary extensions such that the second storage accessory 66 is one individual unit (not shown) instead of four. It is contemplated by the present disclosure that the second storage accessory 66 may be formed of a solid, durable, lightweight material such as, but not limited to, Styrofoam, resin formations, plastic polymers, high density polyethylene, polyvinyl chloride, polylactic acid, acrylonitrile butadiene styrene, thermoplastic polyurethane, or combinations thereof. To removably attach the second storage accessory 66 to the platform 24, each corner piece 86 may comprise a series of slots 96 traversing from the top surface 92 through the bottom surface 94. The series of slots 96 of corner pieces 86 should correspond with the second series of slots 44 in the platform 24. Attachment pieces 62 may be utilized to traverse through both series of slots 44, 96 to removably attach the second storage accessory 66 to the platform 24 of the slidable bed liner 10. In particular, the bottom surface 94 of the second storage accessory 66 may rest upon and be removably secured to the top surface 34 of the platform 24. When all corner pieces 86 are attached to the platform 24, the curved interior walls 88 of the corner pieces 86 of the second storage accessory 66 should form an interior cavity 98 for securing a bucket snugly therein. The interior cavity 98 is generally circular in shape, having an internal diameter 100 that may vary depending on the size of bucket to be stored by the second storage accessory 66. For example, to store a 5 gallon bucket the internal diameter 100 may be approximately 10.750 inches. In another example, to store a 2.5 gallon bucket the internal diameter 100 may be approximately 9 inches. In a further example, to store a 1 gallon bucket, such as a paint can, the internal diameter 100 may be approximately 7.250 inches. In some instances, the varying internal diameters 100 of the second storage accessory 66 may be created by utilizing different sized corner pieces 86 having particular thicknesses that when used together form a specific internal diameter 100. In other instances, the varying internal diameters 100 of the second storage accessory 66 may be created by inserting different ring-shaped spacers 222 having particular thicknesses into the internal interior cavity 98 to form a specific internal diameter 100.

Figure 5A:
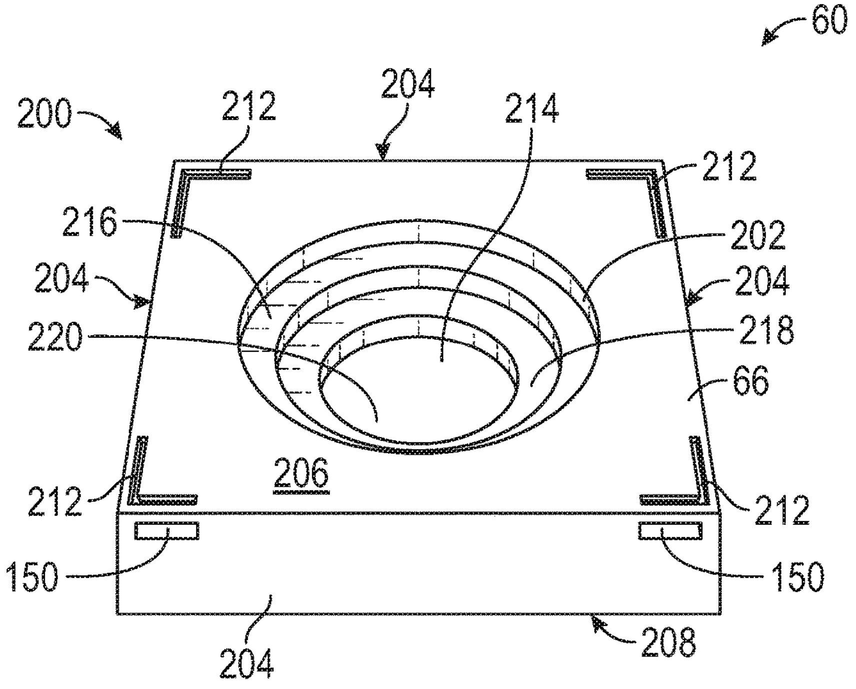
FIG. 5A is a top side perspective view of an alternative storage accessory of FIG. 1 for storing a bucket.

FIG. 5A illustrates a top side perspective view of another aspect 200 of the second storage accessory 66 for storing a bucket as shown removed from the platform 24 of the slidable bed liner 10. The second storage accessory 200 may comprise a curved interior wall 202, at least four exterior walls 204, a top surface 206, and a flat bottom surface 208. The second storage accessory 200 may measure approximately 12-14 inches in length, approximately 12-14 inches in width, and approximately 3-9 inches in height. To removably attach the second storage accessory 66 to the platform 24, each corner 210 may comprise a series of slots 212 traversing from the top surface 206 through the bottom surface 208. The series of slots 212 of the corners 210 should correspond with the second series of slots 44 in the platform 24. Attachment pieces 62 may be utilized to traverse through both series of slots 44, 212 to removably attach the second storage accessory 66 to the platform 24 of the slidable bed liner 10. In particular, the bottom surface 208 of the second storage accessory 66 may rest upon and be removably secured to the top surface 34 of the platform 24. When the second storage accessory 66 is attached to the platform 24, the curved interior wall 202 should form an interior cavity 214 for securing a bucket snugly therein. The interior cavity 214 is generally circular in shape, and comprises a series of circular steps therein. Each step of the series of steps may be of approximately 2-3 inches in height, approximately 2-3 inches in width, and form a unique diameter sized to fit a particular size of bucket to be stored by the second storage accessory 66. For example, to store a 5 gallon bucket a first step 216 may have an internal diameter of approximately 10.750 inches. To store a 2.5 gallon bucket the second step 218 may have an internal diameter of approximately 9 inches. To store a 1 gallon bucket, such as a paint can, the third step 220 may have an internal diameter of approximately 7.250 inches. In some instances, the third step 220 may comprise a hole through the second storage accessory 66 wherein the bucket may fit inside the hole and rest upon the top surface 34 of the platform 24 of the slidable bed liner 10.

Figure 6:
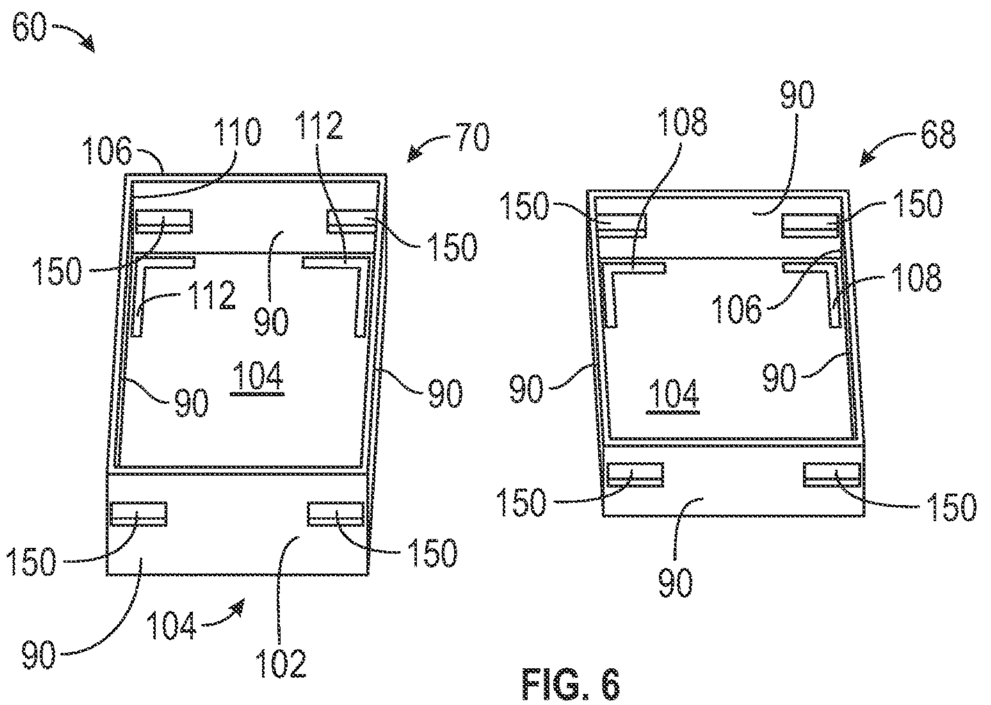

FIG. 6 illustrates a top side perspective view of the third and fourth storage accessories 68, 70 being small and large containers, respectively, as shown removed from the platform 24 of the slidable bed liner 10. The third and fourth storage accessories 68, 70 may each comprise four exterior walls 90 with a flat bottom surface 104. In particular, the third storage accessory 68 may measure approximately 10-24 inches in length, approximately 10-24 inches in width, and 2-12 inches in height. The fourth storage accessory 70 may measure approximately 18-30 inches in length, approximately 12-30 inches in width, and approximately 2-14 inches in height. The third storage accessory 68 is designed to store smaller items such as truck accessories. The fourth storage accessory 70 is designed to store larger items such as tools and equipment.

Shown in FIG. 6, to removably attach the third storage accessory 68 to the platform 24 of the slidable bed liner 10, each corner 106 may comprise a series of slots 108 traversing through the bottom surface 104. The series of slots 108 of corners 106 should correspond with the third series of slots 46 in the platform 24. Attachment pieces 62 may be utilized to traverse through both series of slots 46, 108 to removably attach the third storage accessory 68 to the platform 24 of the slidable bed liner 10. In particular, the bottom surface 104 of the third storage accessory 68 may rest upon and be removably secured to the top surface 34 of the platform 24.

Further shown in FIG. 6, to removably attach the fourth storage accessory 70 to the platform 24, each corner 110 may comprise a series of slots 112 traversing through the bottom surface 104. The series of slots 112 of corners 110 should correspond with the fourth series of slots 48 in the platform 24. Attachment pieces 62 may be utilized to traverse through both series of slots 48, 112 to removably attach the fourth storage accessory 70 to the platform 24 of the slidable bed liner 10. In particular, the bottom surface 104 of the fourth storage accessory 70 may rest upon and be removably secured to the top surface 34 of the platform 24.

Figure 6A:
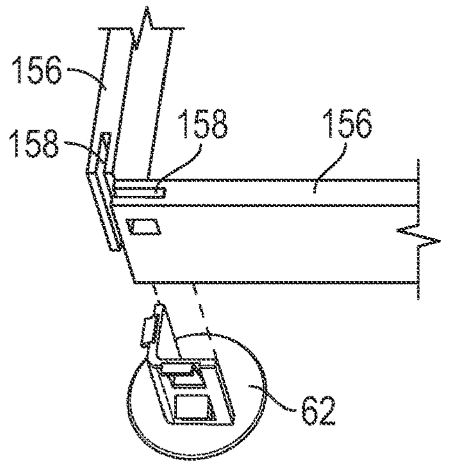
FIG. 6A is a top side perspective view of the storage accessories of FIG. 6 showing an alternative embodiment of the small and large containers for storing various items.

FIG. 6A illustrates an alternative embodiment of the third and fourth storage accessories 68, 70. In particular, the third and fourth storage accessories 68, 70 may comprise separate wall pieces 156 without a flat bottom surface. The separate wall pieces 156 may include slots 158 positioned towards each end. Each slot 158 is configured for insertion of attachment pieces 62 therein. The attachment pieces 62 may be used to join the separate wall pieces 156 together to form a container and removably attach the third and fourth storage accessories 68, 70 to the platform 24 of the slidable bed liner 10.

Figure 7:
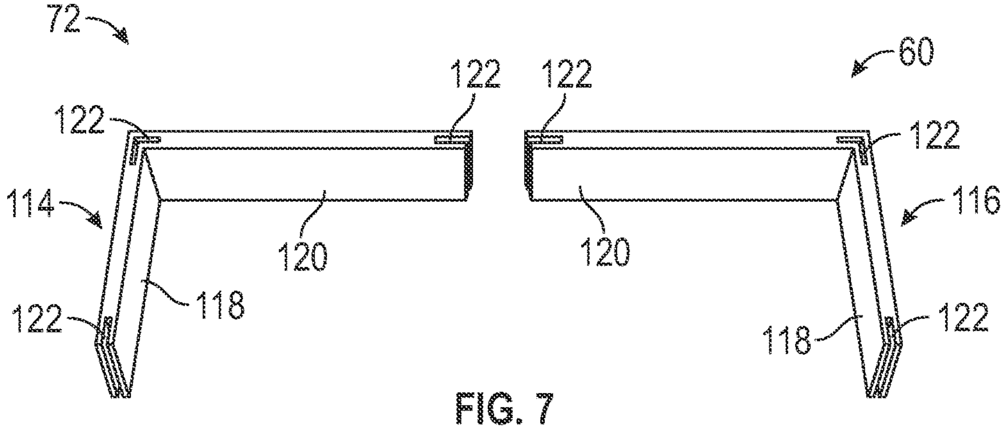

FIG. 7 illustrates a top rear perspective view of the fifth storage accessory 72 being a barrier designed to ensure cargo 20 remains on the slidable bed liner 10 during use, as shown removed from the platform 24 of the slidable bed liner 10. In particular, the fifth storage accessory 72 may comprise a left barrier 114 and an opposite right barrier 116. Each left and right barrier 114, 116 may comprise a side panel 118 and a front panel 120. The side panels 118 may be approximately 12-30 inches in length, approximately 0.125-0.750 inch in width, and approximately 2-5 inches in height. The front panels 120 may be approximately 16-30 inches in length, approximately 0.125-0.750 inch in width, and approximately 2-5 inches in height. To removably attach the fifth storage accessory 72 to the platform 24, each lateral and front panel 118, 120 may comprise a series of slots 122 traversing therethrough. The series of slots 122 should correspond with the fifth series of slots 50 in the platform 24. Attachment pieces 62 may be utilized to traverse through both series of slots 50, 122 to removably attach the fifth storage accessory 72 to the platform 24 of the slidable bed liner 10. In particular, a bottom surface of the fifth storage accessory 72 may rest upon and be removably secured to the top surface 34 of the platform 24. The lateral and front panels 118, 120 of each left and right barrier 114, 116 may be integrally attached together at a right angle. Alternatively, the lateral and front panels 118, 120 of each left and right barrier 114, 116 may comprise separate panel pieces wherein the right angle is formed as the fifth storage accessory 72 is removably attached to the platform 24 of the slidable bed liner 10.

Figure 8:
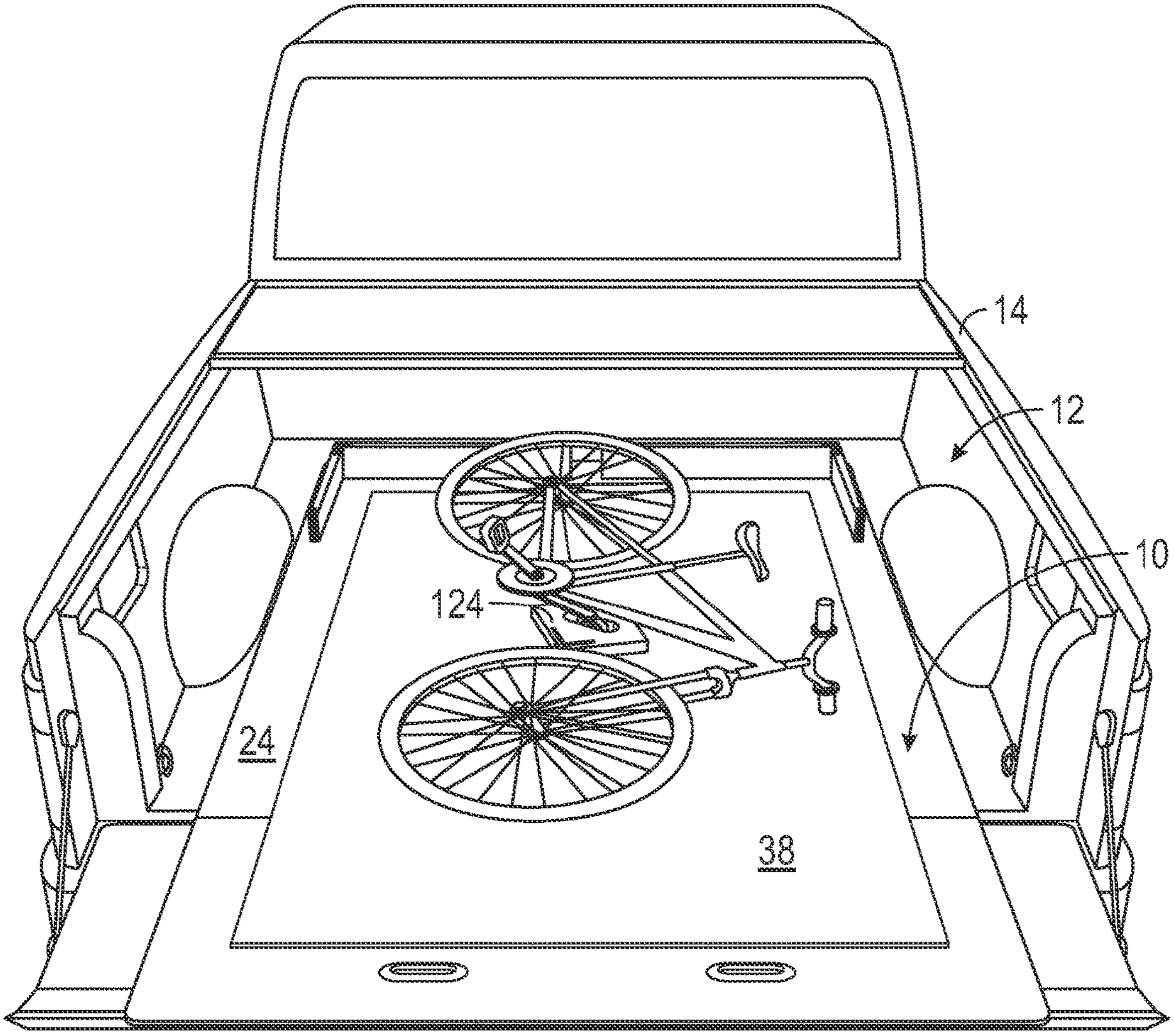

FIG. 8 illustrates a top rear perspective view of the slidable bed liner 10 configured to fit within the open cargo storage area 12 of a vehicle 14 with a removable bicycle storage accessory 124 attached. The removable bicycle storage accessory 124 may be removably attached to the platform 24 of the slidable bed liner 10 using attachment pieces 62 configured to slide through the plurality of slots 40. In particular, the sixth series of slots 52 in the platform 24 with corresponding attachment pieces 62 may be used to removably attach the bicycle storage accessory 124 to ensure a bicycle is safely stored and secured on the slidable bed liner 10 during use. It is contemplated by the present disclosure that the bicycle storage accessory 124 may be formed of a solid, durable, lightweight material such as, but not limited to, Styrofoam, plastic polymers, high density polyethylene, polyvinyl chloride, polylactic acid, acrylonitrile butadiene styrene, thermoplastic polyurethane, or combinations thereof. It is further contemplated by the present disclosure that an optional sheet of foam 38 may be placed in between the top surface 34 of the platform 24 and the bicycle to provide additional cushioning effects to the bicycle during use.

Figure 9:
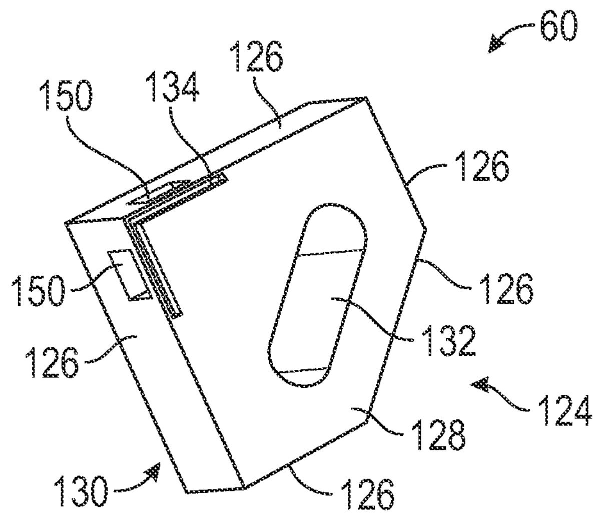

FIG. 9 illustrates a top side perspective view of the bicycle storage accessory 124 for storing the bicycle, as shown removed from the platform 24 of the slidable bed liner 10. In particular, the bicycle storage accessory 124 may comprise at least three exterior walls 126 approximately 4-6 inches in length, approximately 4-6 inches in width, and approximately 2-5 inches in height, including a top surface 128 and a flat bottom surface 130. The bicycle storage accessor 124 may further comprise an opening 132 traversing through the bottom surface 130 to the top surface 128. The opening 132 is configured to fit and secure a pedal of a bicycle therein, including both clip-on and clip-less pedals, wherein the opening 132 may be approximately 5-7 inches in length and approximately 2-4 inches in width. To removably attach the bicycle storage accessory 124 to the platform 24, the bicycle storage accessory 124 may comprise a series of slots 134 traversing therethrough. The series of slots 134 should correspond with the sixth series of slots 52 in the platform 24. Attachment pieces 62 may be utilized to traverse through both series of slots 52, 134 to removably attach the bicycle storage accessory 124 to the platform 24 of the slidable bed liner 10. In particular, the bottom surface 130 of the bicycle storage accessory 124 may rest upon and be removably secured to the top surface 34 of the platform 24.

FIGS. 10-14 illustrate three different types of attachment pieces 62 that may be utilized to removably attach the storage accessories 60 to the platform 24 of the slidable bed liner 10. The attachment pieces 62 may be formed from a single piece of durable, rigid material, such as but not limited to, Styrofoam, resin formations, plastic polymers, high density polyethylene, polyvinyl chloride, polylactic acid, acrylonitrile butadiene styrene, thermoplastic polyurethane, or combinations thereof. Each attachment piece 62 may comprise a base 136 having a circular, convex shape designed to prevent the attachment piece 62 from catching on the top surface of the floor 22 of the cargo storage area 12 as the slidable bed liner 10 slides in and out of the open cargo storage area 12 of the vehicle 14. The bottom of the base 136 should also be substantially smooth to mitigate friction between the attachment piece 62 and the top surface of the floor 22 of the cargo storage area 12. The base 136 may be approximately 2-5 inches in diameter and 0.125-0.750 inches in thickness. In particular, the base 136 should be larger in diameter than the slots 40 in the platform 24, to prevent the attachment piece 62 from being pulled through the slot 40 during use. Each attachment piece 62 may further comprise a vertical rail 138 extending upwards from a top surface of the base 136. The vertical rail 138 may be 1-4 inches in length, approximately 0.125-0.750 inch in width, and approximately 2-4 inches in height. The vertical rail 138 may include three distinct configurations to form the three different types of attachment pieces 62.

Figure 10:
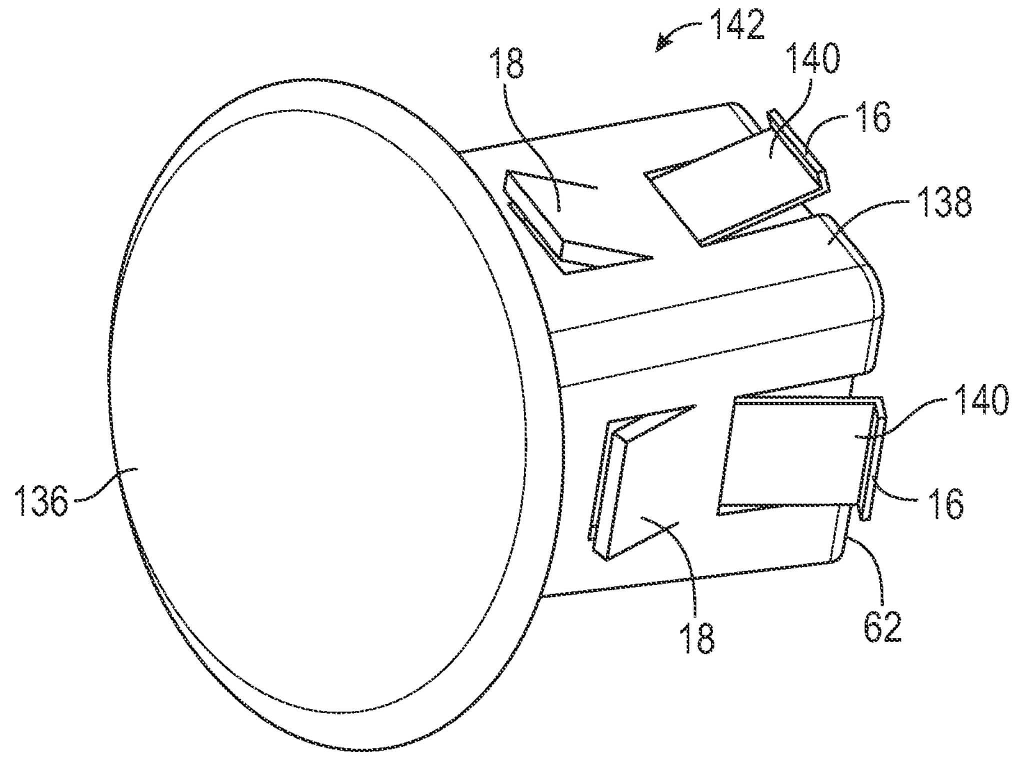
Figure 10A:
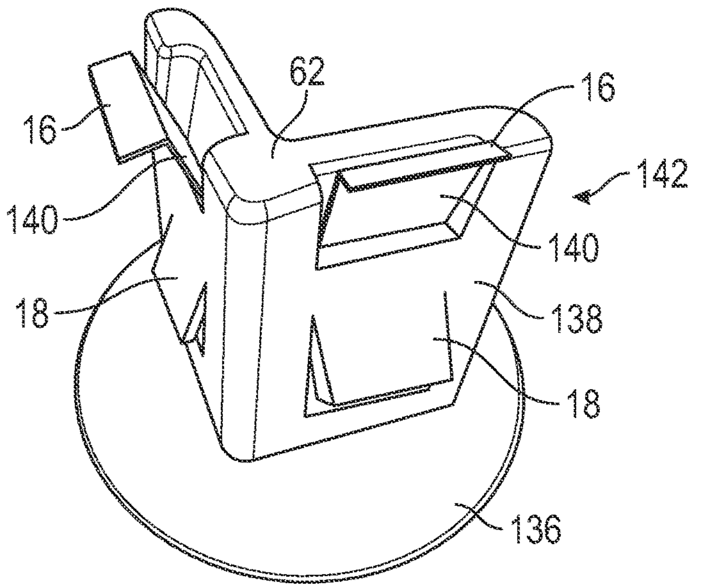
FIG. 10A is a top side perspective view of the corner attachment piece of FIG. 10 for removably attaching storage accessories to the slidable bed liner.
Figure 11:
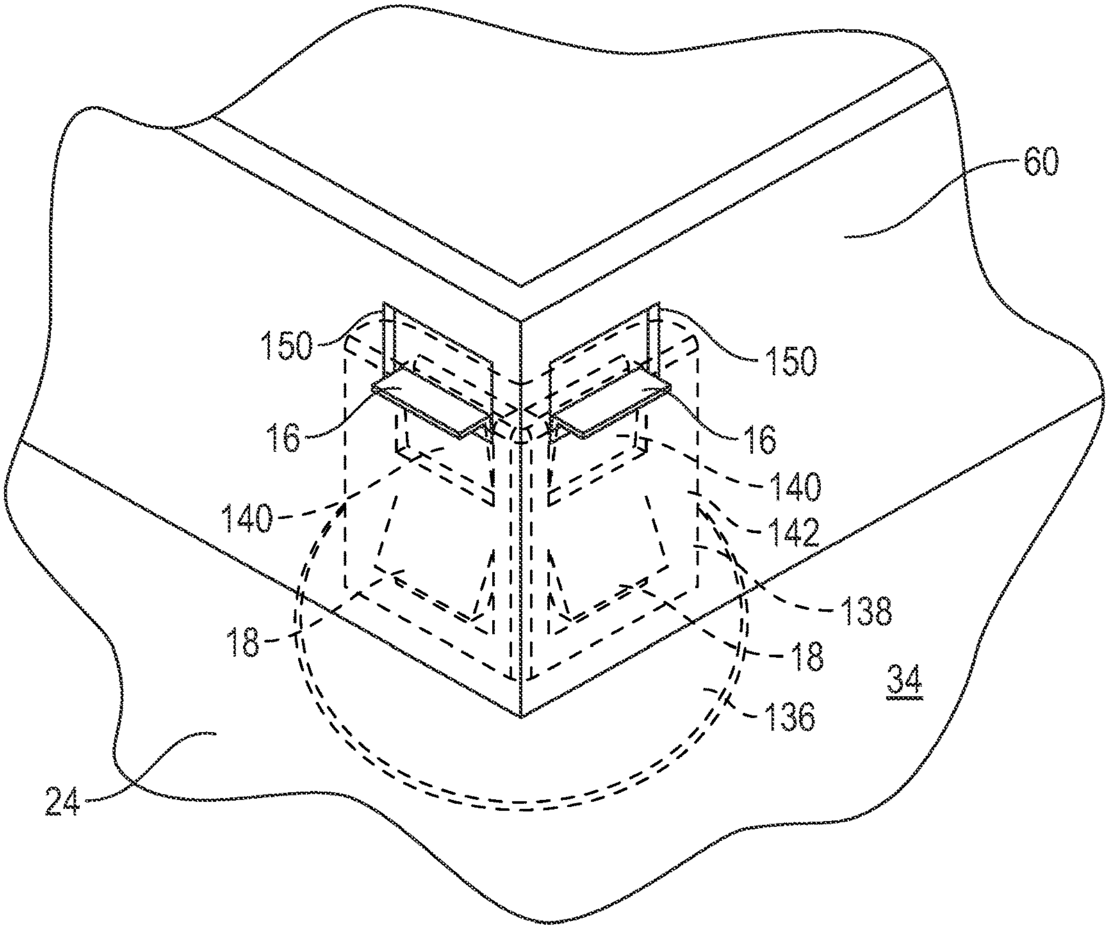

Shown in FIGS. 10, 10A, 11, the first type of attachment piece 62 may be a corner attachment piece 142. Corner attachment pieces 142 may be used to removably attach storage accessories 60 to the slidable bed liner 10. For example, corner attachment pieces 142 may be used to attach the first, second, third, fourth, and bicycle storage accessories 64, 66, 68, 70, 124 to the platform 24 using the corresponding first, second, third, fourth, and sixth series of slots 42, 44, 46, 48, 52. The corner attachment pieces 142 may also be used to attach ends of the side panel 118 and the front panel 120 that form the right angle of the fifth storage accessory 72 to the platform 24 using the corresponding fifth series of slots 50.

Figure 12:
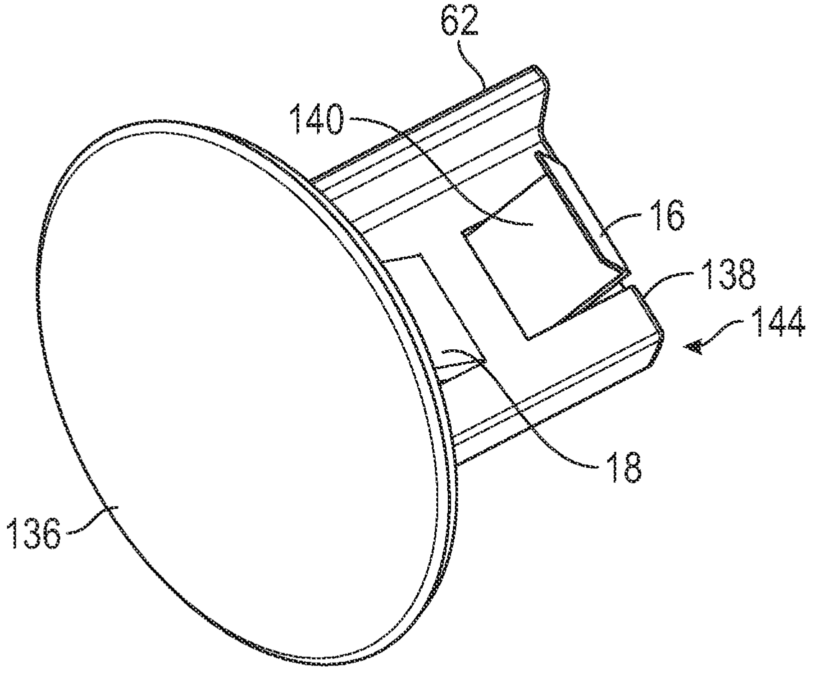
Figure 12A:
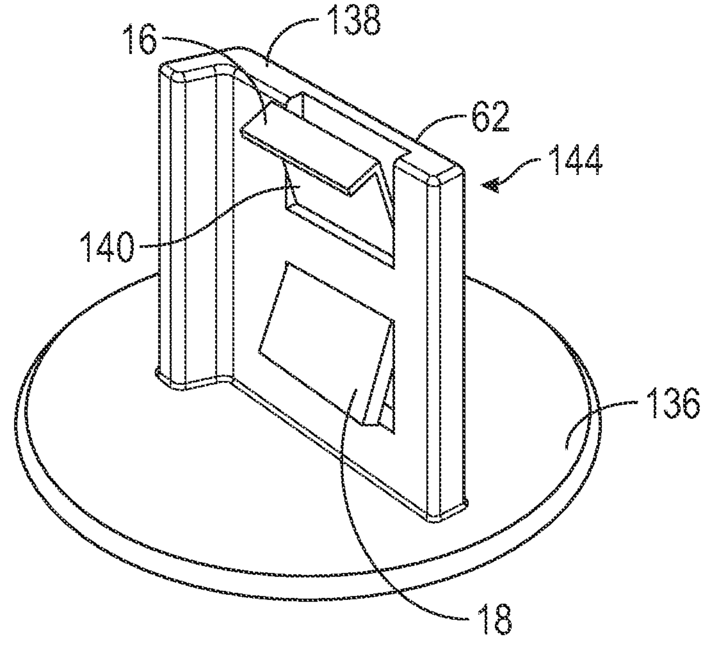
FIG. 12A is a top side perspective view of the right side straight attachment piece of FIG. 12 for removably attaching storage accessories to the slidable bed liner.
Figure 13:
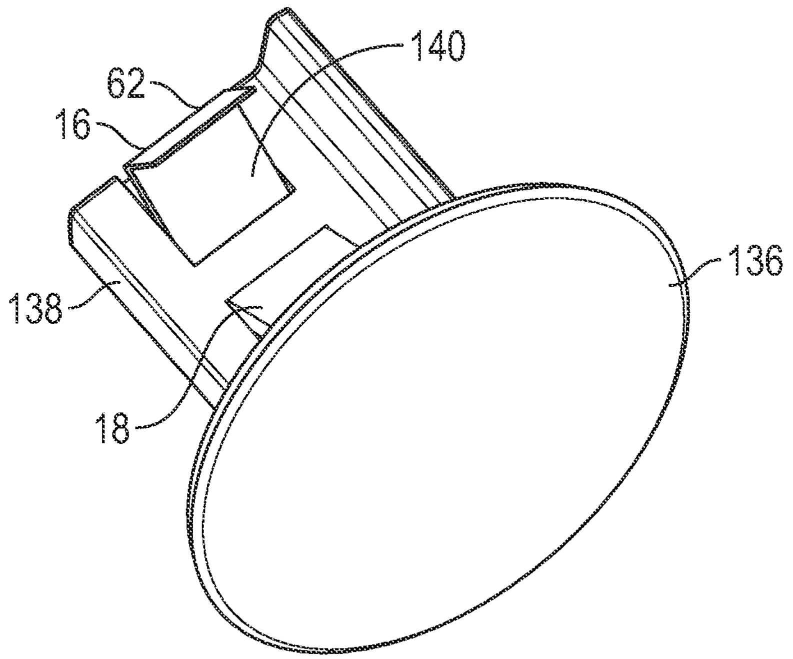
Figure 13A:
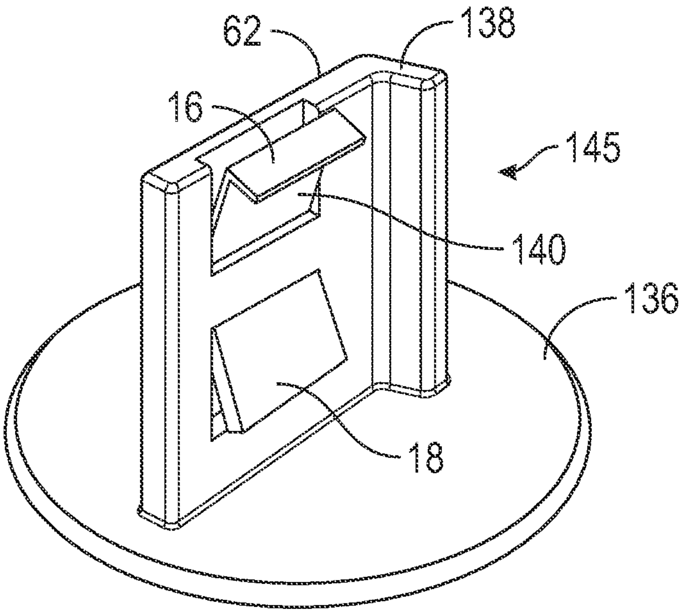
FIG. 13A is a top side perspective view of the left side straight attachment piece of FIG. 13 for removably attaching storage accessories to the slidable bed liner.
Figure 14:
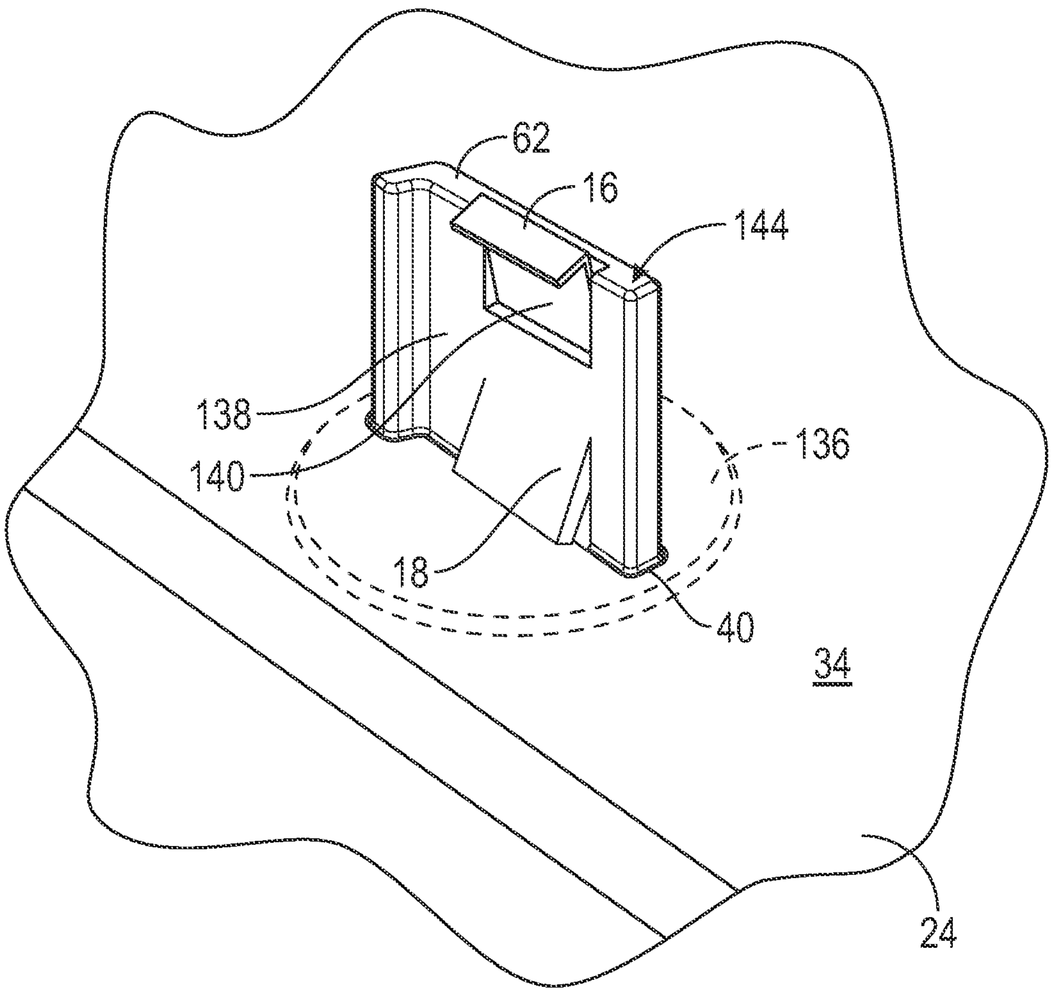

Further shown in FIGS. 12, 12A, 14, the second type of attachment piece 62 may be a right side straight attachment piece 144 for removably attaching storage accessories 60 to the slidable bed liner 10. Still further shown in FIGS. 13, 13A, the third type of attachment piece 62 may be a left side straight attachment piece 145. The right side and the left side straight attachment pieces 144, 145 may be used to attach respective ends of the side panel 118 and the front panel 120 opposite from the right angle of the fifth storage accessory 72 to the platform 24 using the corresponding fifth series of slots 50. In some instances, the straight attachment pieces 144, 145 may include a curved end to help direct cargo 20 towards an interior of the platform 24. In other instances, the straight attachment pieces 144, 145 may not include the curved end (not shown).

Depicted in FIGS. 10-14, each attachment piece 62, whether being corner 142, right side straight 144, or left side straight 145, may include at least one locking mechanism 140 that is configured to secure the storage accessory 60 to the attachment piece 62. Alternatively, the attachment piece 62 may not include the locking mechanism 140 wherein the storage accessory 60 is secured to the attachment piece 62 via gravity. When utilized, the locking mechanism 140 may comprise a resilient clip 16 positioned towards a top of the vertical rail 138. In some instances, for example as shown in FIG. 11, the clip 16 may be configured to slide into a corresponding opening 150 on the storage accessory 60 and lock in position therein to secure the storage accessory 60 to the attachment piece 62. In other instances, for example as shown in FIG. 15A, the clip 16 may be configured to latch onto a top surface of the storage accessory 60 and lock in position thereon to secure the storage accessory 60 to the attachment piece 62 (e.g., after the vertical rail 138 of attachment piece 62 is inserted in slot 152 of the storage accessory 60). The clip 16 may be locked in position either in the opening 150 or on the top surface of the storage accessory 60 depending on the height of the storage accessory 60. The clip 16 may be released from the storage accessory 60 by manually pushing the clip 16 back through the opening 150 or slot 152 of the storage accessory 60 using a thumb, finger or specialized tool (not shown).

Also depicted in FIGS. 10-14, the vertical rail 138 of each attachment piece 62 may further include at least one retention tab 18 positioned either on an interior or an exterior side of the vertical rail 138. Particularly shown in FIG. 14, the tab 18 of exemplary attachment piece 62 is configured to catch on the top surface 34 of the platform 24 after the vertical rail 138 is inserted into slot 40 to secure the attachment piece 62 to the platform 24. The tab 18 may be released from the platform 24 by manually pushing the tab 18 inwards towards the vertical rail 138 such that the vertical rail 138 may be slid back through slot 40 of the platform 24 using a thumb, finger, or specialized tool (not shown). In some instances, the vertical rail 138 may comprise a combination of said locking mechanism 140 and said tab 18 to secure the storage accessory 60 to the attachment piece 62 and the attachment piece 62 to the platform 24. In other instances, the vertical rail 138 may comprise either the locking mechanism 140 or the tab 18 (not shown).

Figure 15:
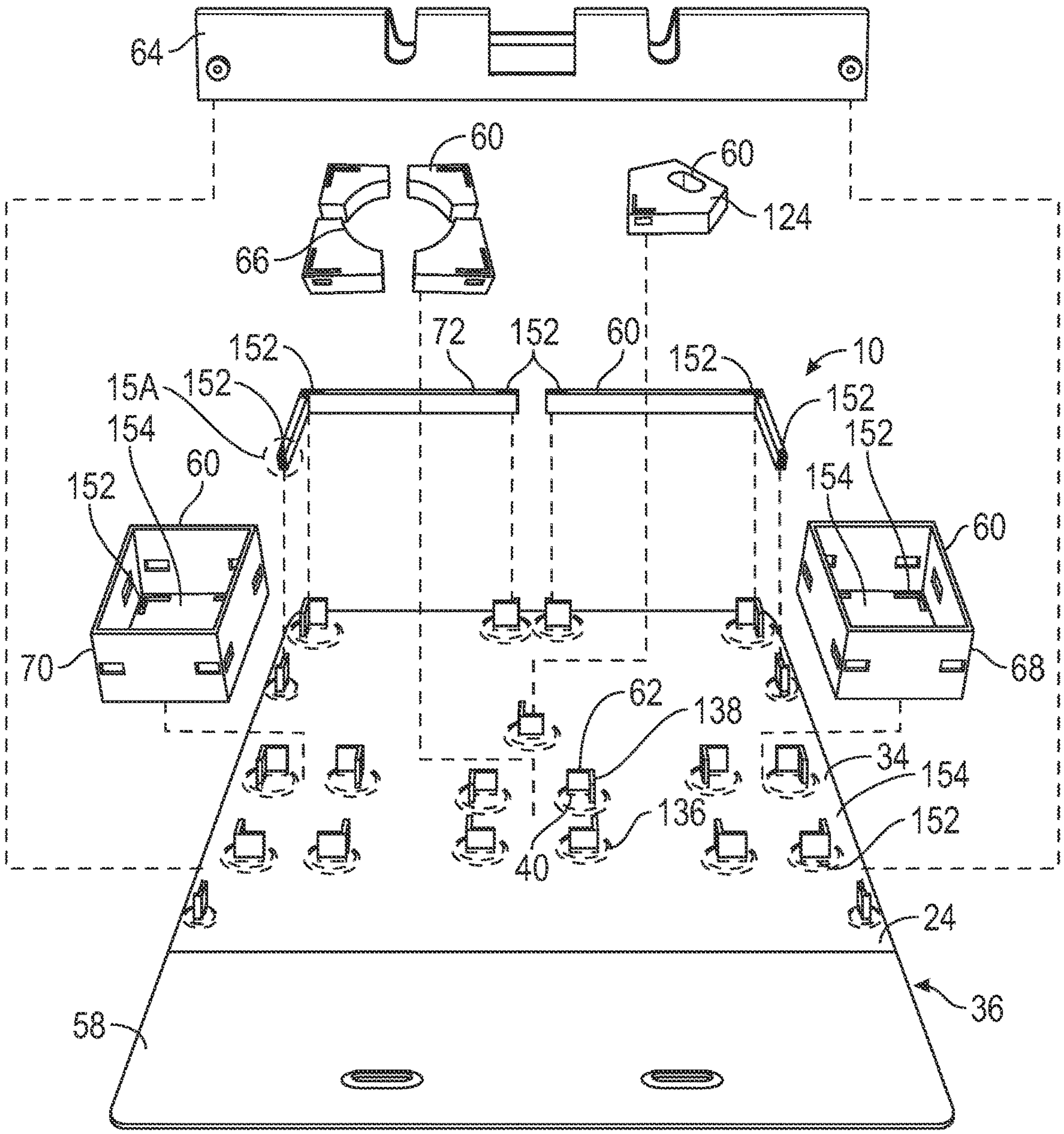
FIG. 15 is an exploded view of the slidable bed liner of FIG. 1 showing how the plurality of storage accessories are removably attached to the slidable bed liner.
Figure 15A:
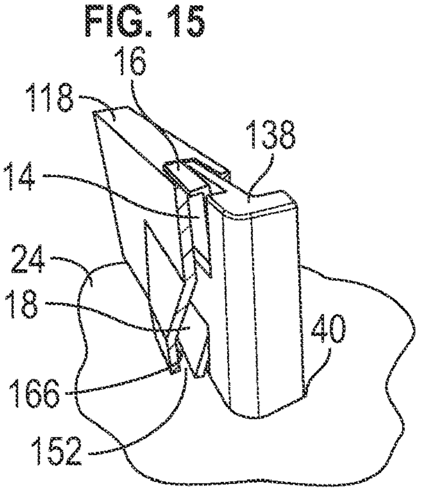
FIG. 15A is a magnified top side cross-sectional view showing an end of the left barrier of the fifth storage accessory of FIG. 15.
Figure 16:
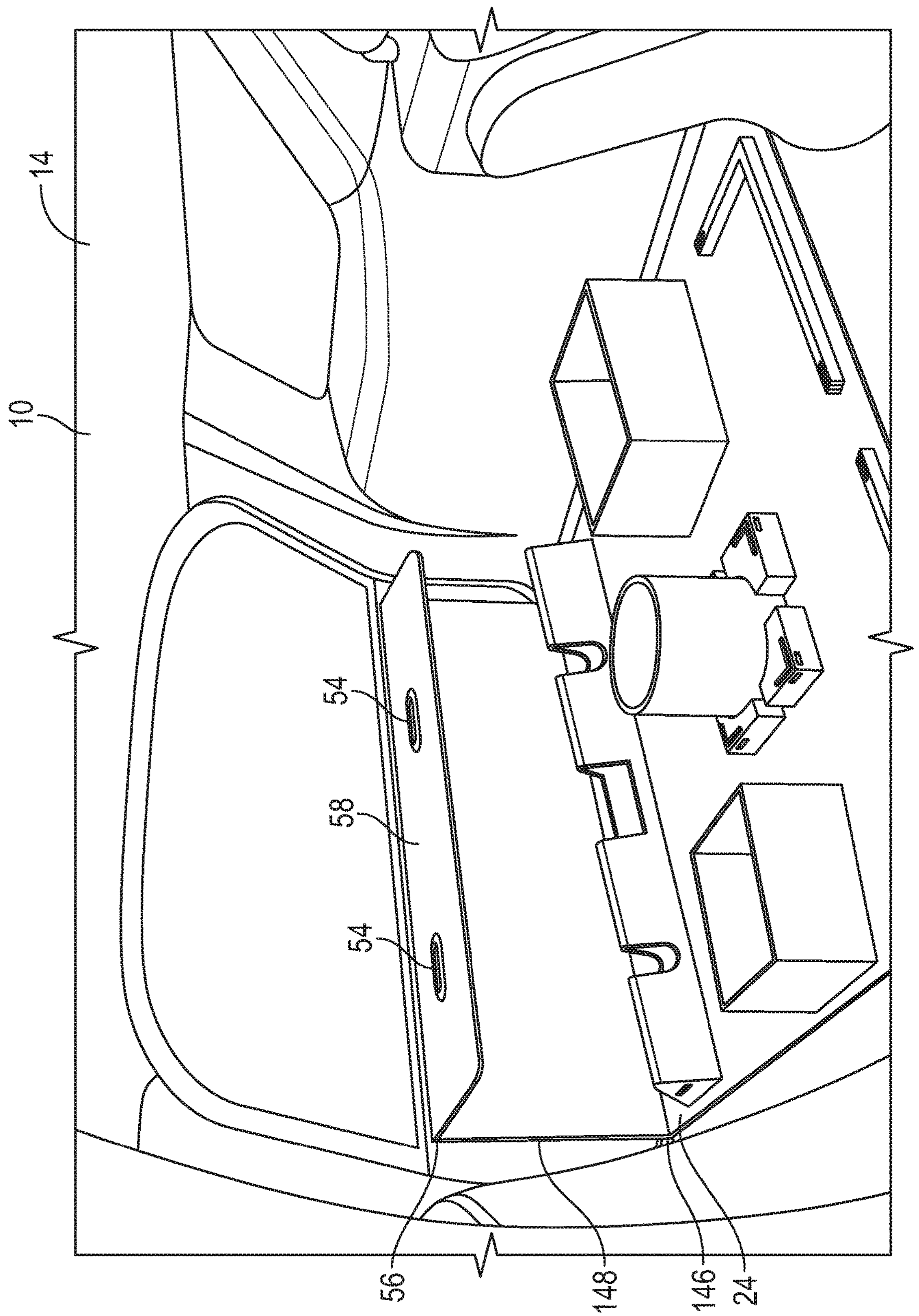
FIG. 16 is a top side perspective view of the slidable bed liner of FIG. 1 with an optional second crease line and intermediary flap compressed against the closed cargo storage area of the vehicle.

FIG. 15 illustrates an exploded view of the slidable bed liner 10 showing how storage accessories 60 are removably attached to the platform 24 using attachment pieces 62. It is contemplated by the present disclosure that the same general concept may be used to removably attach storage accessories 64, 66, 68, 70, 72, 124 to the platform 24. It is further contemplated by the present disclosure that the same general concept may be used with both the corner attachment piece 142 and the left and right straight attachment pieces 144, 145. In particular, the vertical rail 138 of the attachment piece 62 is configured to slide up from the bottom surface 36 of the platform 24 and through slot 40, wherein the base 136 of the attachment piece 62 remains positioned below the platform 24. The vertical rail 138 of each attachment piece 62 is further configured to extend through slot 40 and above platform 24. Each storage accessory 60 may comprise at least one slot 152 positioned therethrough and configured to fit the vertical rail 138 of the attachment piece 62. The storage accessory 60 may be slid down over the vertical rail 138 of the attachment piece 62, whereas the vertical rail 138 slides into the corresponding slot 152 of the storage accessory 60. The storage accessory 60 is further slid down over the vertical rail 138 of the attachment piece 62 until a bottom surface 154 of the storage accessory 60 rests upon the top surface 34 of the platform 24. Thus the vertical rail 138 is configured to traverse through both slot 40 in the platform 24 and slot 152 in the storage accessory 60 to removably attach the storage accessory 60 to the platform 24 of the slidable bed liner 10.

Shown in FIG. 15, certain slots 40 in the platform 24 may be utilized together as a series for removably attaching a particular storage accessory 62 to the platform 24. Each series of slots is unique to removably attach a particular storage accessory 62. For example as depicted in FIG. 15, at least one attachment piece 62 may be used to removably attach the sixth storage accessory being the bicycle storage accessory 124 to the sixth series of slots 52 in the platform 24. Other examples include at least one attachment piece 62 being used to removably attach: (i) the first storage accessory for storing long handled tools 64 to the first series of slots 42 in the platform 24; (ii) the second storage accessory for storing a bucket 66 to the second series of slots 44 in the platform 24; (iii) the third storage accessory being a small container 68 to the third series of slots 46 in the platform 24; (iv) the fourth storage accessory being a large container 70 to the fourth series of slots 48 in the platform 24; and (v) the fifth storage accessory being a barrier 72 to the fifth series of slots 50 in the platform 24.

FIG. 15A is a magnified top side cross-sectional view showing an end of the side panel 118 of the left barrier 114 of the fifth storage accessory 72. In particular, an exterior wall of the side panel 118 may comprise an inclined portion 164. In some instances the inclined portion 164 may be gently sloped, while in other instances the inclined portion 164 may comprise an angle. The inclined portion 164 is designed to form an interior pocket 166. The pocket 166 provides space for the retention tab 18 of the left side straight attachment piece 145 to expand and catch on the top surface 34 of the platform 24 after the vertical rail 138 is inserted into slot 152 of the side panel 118. It is important to provide space for the retention tab 18 to expand so that the left side straight attachment piece 145 may be secured to the platform 24. FIG. 15A further shows the clip 16 of the left side straight attachment piece 145 latched onto a top surface of the side panel 118 and locked in position thereon to secure the side panel 118 to the left side straight attachment piece 145 (e.g., after the vertical rail 138 of left side straight attachment piece 145 is inserted in slot 152 of side panel 118). While FIG. 15A depicts the side panel 118 of the left barrier 114 of the fifth storage accessory 72 as comprising the inclined portion 164 to form pocket 166, it is contemplated by the present disclosure that the other exterior walls of barrier 72, including the exterior walls of the remaining storage accessories 64, 66, 68, 70, 124, may similarly comprise inclined portions 164 to form pockets 166 for corresponding retention tab 18 expansion wherever attachment pieces 62 are utilized.

FIG. 16 illustrates a top side perspective view of the slidable bed liner 10 comprising an optional second crease line 146 to facilitate the bending, creasing, or folding of the slidable bed liner 10 along the second crease line 146. In other instances, the crease line 146 may comprise a hinge that provides similar functionality. The second crease line 146 may be positioned approximately 15-25 inches proximal to the first crease line 56 of the platform 24 and traverse the width of the slidable bed liner 10. The second crease line 146 is designed to form an intermediary flap 148 that may also be folded up and compressed against the closed cargo storage area 12 of the vehicle 14, in addition to the rear flap 58. The second crease line 146 and intermediary flap 148 may be incorporated into the platform 24 such that the slidable bed liner 10 becomes compatible with a vehicle 14 such as an SUV or similar sized pickup truck having a smaller cargo storage area 12. It is contemplated by the present disclosure that the slidable bed liner 10 as depicted in FIG. 13 is universally applicable to SUVs and similar sized pickup trucks of different years, makes, models, and manufacturers. In particular, the platform 24 of the slidable bed liner 10 may be sized appropriately to fit within the confines of the cargo storage area 12 of an SUV or similar sized pickup truck. As a non-limiting example, and depending on the particular year, make, model, and manufacturer of the vehicle 14, the platform 24 may range approximately 3-5 feet in length and 3-4 feet in width. The platform 24 may further have a uniform thickness ranging between approximately 0.250-0.750 inches to provide sufficient strength and rigidity to the slidable bed liner 10. Depending on the needs of the user, the slidable bed liner 10 sized to fit within the cargo storage area 12 of an SUV or similar sized pickup truck may not include all the plurality of storage accessories 60 as comparatively utilized with a standard pickup truck or cargo van.

Another aspect of the present disclosure is a method of using the slidable bed liner 10 of FIGS. 1-16 to transport cargo 20 in a vehicle 14. In particular, the method may comprise providing a vehicle having a cargo storage area 12 and cargo 20 in need of transport. The method may further comprise providing the slidable bed liner 10 of FIGS. 1-16. Generally speaking, the slidable bed liner 10 utilizes three categories of components, comprising: (a) platform 24; (b) storage accessories 60; and (c) attachment piece 62. Each component may be sold separately, in certain combinations, or together as a kit. The design of slidable bed liner 10 allows for use in three convenient steps. First, attachment pieces 62 may be inserted through slots 40 from the bottom of the platform 24. Second, each attachment piece 62 may be secured to the platform 24 via retention tab 18 catching on a top surface of the platform 24. Third, each storage accessory 60 may be secured to attachment piece(s) 62 via resilient clip 16 of the locking mechanism 140 sliding into a corresponding opening 150 or latching onto a top surface of the storage accessory 60 and locking in position. The clip 16 may be released from the storage accessory 60 by manually pushing the clip 16 back through the opening 150 or slot 122 of the storage accessory 60 using a thumb, finger or specialized tool (not shown). Once the three steps have been completed, the storage accessories 60 may be utilized to secure various cargo 20 to the slidable bed liner 10. The slidable bed liner 10 may slidably transition between the front and rear of the cargo storage area 12 of the vehicle 14 to provide convenience access to cargo 20 therein, thus eliminating any need for a user to climb into the cargo storage area 12 to mitigate the risk of falls and injury.

Figure 17:
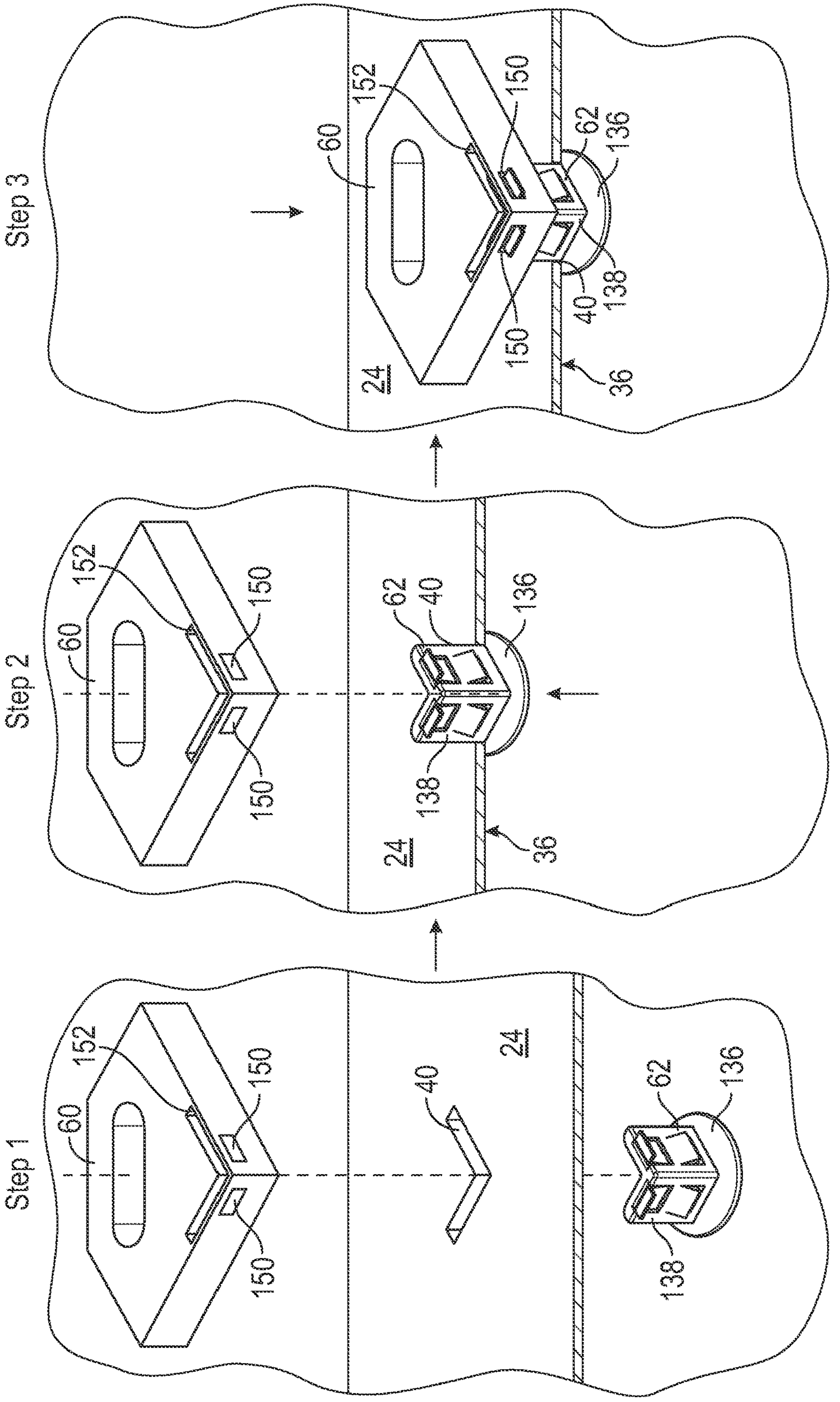
FIG. 17 illustrates method steps of removably attaching an exemplary storage accessory to the platform using an exemplary attachment piece of the slidable bed liner of FIGS. 1-16.

FIG. 17 illustrates the method steps of removably attaching an exemplary storage accessory 60 to the platform 24 using an exemplary attachment piece 62. A particular storage accessory 60 may be selected depending on the cargo 20 to be transported. While FIG. 17 shows the selected storage accessory 60 being the bicycle storage accessory 124, it is contemplated by the present disclosure that the other storage accessories 64, 66, 68, 70, 72 may also be selected wherein the same general concept may be used to removably attach all storage accessories 60 to the platform 24. Furthermore while FIG. 14 shows the exemplary attachment piece 62 being the corner attachment piece 142, it is contemplated by the present disclosure that the same general concept may also be used with both the left and right straight attachment pieces 144, 145.

Shown in FIG. 17, the attachment piece 62 may be positioned under platform 24 and beneath slot 40. The storage accessory 60 may be further positioned above platform 24 and over slot 40, wherein slot 152 of the storage accessory 60 is aligned with slot 40 of the platform 24. Shown in Step 2, the vertical rail 138 of the attachment piece 62 may be slid up from the bottom surface 36 of the platform 24 and through slot 40, wherein the base 136 of the attachment piece 62 remains positioned below the platform 24. The vertical rail 138 of the attachment piece 62 is further extended through slot 40 and above platform 24. The storage accessory 60 may then be moved down over the vertical rail 138 of the attachment piece 62, whereas the vertical rail 138 is configured to slide into the corresponding slot 152 of the storage accessory 60. Still further shown in Step 3, the storage accessory 60 is further slid down over the vertical rail 138 of the attachment piece 62 until a bottom surface 154 of the storage accessory 60 rests upon the top surface 34 of the platform 24. Thus the vertical rail 138 is configured to traverse through both slot 40 in the platform 24 and slot 152 in the storage accessory 60 to removably attach the storage accessory 60 to the platform 24 of the slidable bed liner 10. Depending on the height of the storage accessory 60, the storage accessory 60 may be locked in position by sliding the resilient clip 16 of the locking mechanism 140 on the vertical rail 138 into corresponding opening 150 or latching the clip 16 onto the top surface of the storage accessory 60. Notably, the attachment piece 62 is prevented from being pulled through slot 40 of the platform 24 during use because base 136 comprises a larger diameter as compared to slot 40.

The method may further comprise placing the slidable bed liner 10 in an open cargo storage area 12 of the vehicle, wherein the platform 24 may extend out of the open cargo storage area 12 to provide convenient access for loading the cargo 20 therein. The cargo 20 may then be loaded onto the slidable bed liner 10, particularly utilizing the storage accessory 60 to ensure reliable securement of the cargo 20 therein. The slidable bed liner 10 may then be pushed fully into the cargo storage area 12 of the vehicle 14 using handholds 54. Next the cargo storage area 12 may be closed and the cargo 20 transported to a certain destination. Once reaching the destination, the cargo storage area 12 may be opened. Using handholds 54, the slidable bed liner 10 may be extended out of the cargo storage area 12 to facilitate convenient unloading of the cargo 20 therefrom.

The slidable bed liner 10 and method of use of the present disclosure are universally applicable to vehicles of all years, makes, models, and manufacturers. It is further contemplated that each component of the slidable bed liner 10, namely, the platform 24, storage accessories 60, and attachment pieces 62 may be sold separately, in certain combinations, or together as a kit. Although the disclosure has been described and illustrated with respect to preferred aspects thereof, it is not to be so limited since changes, modifications, and combinations thereof may be made which are within the full intended scope of the disclosure.

What is claimed is:

1. A slidable bed liner for a cargo storage area of a vehicle, comprising:
- a plurality of storage accessories, including:
  - a first storage accessory configured to store long handled tools;
  - a second storage accessory configured to store a bucket;
  - a third storage accessory being a first container;
  - a fourth storage accessory being a second container;
  - a fifth storage accessory being a retaining barrier; and
  - a sixth storage accessory being a bicycle storage accessory;
- a generally rectangular platform, including:
  - a top side;
  - a bottom side;
  - a front end;
  - a rear end;
  - the bottom side of the platform having a coefficient of friction designed to slide along a top surface of a floor of the cargo storage area of the vehicle;
  - a rear flap hingedly secured towards the rear end of the platform to form a first crease line;
  - at least one handhold positioned on the rear flap;
  - a first series of slots traversing through the platform configured to removably attach the first storage accessory for storing the long handled tools, the first series of slots traversing through the platform and the first storage accessory acting as a pair;
  - a second series of slots traversing through the platform configured to removably attach the second storage accessory for storing the bucket, the second series of slots traversing through the platform and the second storage accessory acting as a pair;
  - a third series of slots traversing through the platform configured to removably attach the third storage accessory being the first container, the third series of slots traversing through the platform and the third storage accessory acting as a pair;
  - a fourth series of slots traversing through the platform configured to removably attach the fourth storage accessory being the second container, the fourth series of slots traversing through the platform and the fourth storage accessory acting as a pair;
  - a fifth series of slots traversing through the platform configured to removably attach the fifth storage accessory being the retaining barrier, the fifth series of slots positioned towards the front end of the platform, the fifth series of slots traversing through the platform and the fifth storage accessory acting as a pair;
  - a sixth series of slots traversing through the platform configured to removably attach the sixth storage accessory being the bicycle storage accessory, the sixth series of slots traversing through the platform and the sixth storage accessory acting as a pair;
  - a plurality of attachment pieces configured to removably attach the storage accessories to the platform through the first, the second, the third, the fourth, the fifth, or the sixth series of slots traversing through the platform;
  - wherein each series of slots are fixed and only correspond with the paired storage accessory;
  - wherein each series of slots are configured to removably attach a corresponding storage accessory to the platform;
  - wherein each storage accessory of the plurality of storage accessories has a fixed series of slots traversing through a bottom surface of the storage accessory which corresponds with the paired series of slots traversing through the platform;
- wherein the slidable bed liner is designed to slide in and out of an open cargo storage area of the vehicle to facilitate the loading and unloading of cargo.

2. The slidable bed liner of claim 1, wherein the plurality of attachment pieces traverse through both the series of slots in the platform and the series of slots in the storage accessories to removably attach the storage accessory to the platform.

3. The slidable bed liner of claim 2, wherein each attachment piece of the plurality of attachment pieces comprises:
- a base having a circular, convex shape designed to prevent the attachment piece from catching on the top surface of the floor of the cargo storage area of the vehicle as the slidable bed liner slides in and out of the open cargo storage area of the vehicle;
- the base being larger in diameter than the series of slots in the platform to prevent the attachment piece from being pulled through a slot during use;
- a vertical rail extending upwards from a top surface of the base;
- the vertical rail configured to traverse through both the series of slots in the platform and the series of slots in the storage accessories to removably attach the storage accessory to the platform.

4. The slidable bed liner of claim 3, wherein the vertical rail of each attachment piece includes a locking mechanism configured to removably secure the attachment piece to the storage accessory and a retention tab configured to catch on a top surface of the platform to secure the attachment piece to the platform.

5. The slidable bed liner of claim 1, wherein the second storage accessory configured to store the bucket comprises:

four corner pieces;

each corner piece including a curved interior wall, a top surface, and a flat bottom surface;

the fixed series of slots traversing through the bottom surface of each corner piece;

the fixed series of slots of each corner piece corresponding with the second series of slots in the platform; and the plurality of attachment pieces traversing through both the fixed series of slots in the corner pieces and the second series of slots in the platform to removably attach the second storage accessory to the platform;

wherein the curved interior walls of the four corner pieces when attached to the platform form an interior cavity for securing a bucket snugly therein.

6. The slidable bed liner of claim 5, further comprising a ring-shaped spacer configured to be inserted into the interior cavity to secure the different sized bucket as compared to the second storage accessory acting alone.

7. The slidable bed liner of claim 1, wherein the second storage accessory configured to store the bucket comprises:

a curved interior wall, four exterior walls, a top surface, and a flat bottom surface;

the fixed series of slots traversing through the bottom surface;

the fixed series of slots corresponding with the second series of slots in the platform; and the plurality of attachment pieces traversing through both the fixed series of slots in the second storage accessory and the second series of slots in the platform to removably attach the second storage accessory to the platform;

the curved interior wall when attached to the platform forms an interior cavity for securing the bucket snugly therein;

the interior cavity comprising a series of circular steps;

wherein each step of the series of steps form a unique diameter sized to fit a particular size of bucket to be stored by the second storage accessory.

8. The slidable bed liner of claim 1, further comprising an intermediary flap positioned proximal to the rear flap of the platform;

the intermediary flap hingedly secured to the rear flap at the first crease line; the intermediary flap hingedly secured to the rest of the platform at a second crease line; and the intermediary flap and the rear flap configured to be folded up and compressed against a closed cargo storage area of the vehicle such that the slidable bed liner becomes compatible with a vehicle having a smaller cargo storage area.

9. The slidable bed liner of claim 1, wherein the platform is comprised of cardboard materials.

10. A slidable bed liner for a cargo storage area of a vehicle, comprising:

a plurality of storage accessories;

a platform, including:

a generally rectangular shape;

the platform including a top side, a bottom side, a front end, and a rear end;

the bottom side of the platform having a coefficient of friction designed to slide along a top surface of a floor of the cargo storage area of the vehicle;

a rear flap hingedly secured towards the rear end of the platform to form a first crease line;

at least one handhold positioned on the rear flap;

a plurality of series of slots traversing through the platform;

each series of slots being fixed and only correspond with one of the plurality of storage accessories as a pair;

each series of slots configured to removably attach the corresponding paired storage accessory to the platform; and a plurality of attachment pieces configured to removably attach the plurality of storage accessories to the platform through the paired plurality of series of slots traversing through the platform;

each storage accessory of the plurality of storage accessories having a fixed series of slots traversing through a bottom surface of the storage accessory and corresponding with a particular series of slots traversing through the platform, wherein the slidable bed liner is designed to slide in and out of an open cargo storage area of the vehicle to facilitate the loading and unloading of cargo.

11. The slidable bed liner of claim 10, wherein the plurality of series of slots traversing through the platform comprises at least two of the following: a first series of slots configured to removably attach a first storage accessory of the plurality of storage accessories for storing long handled tools; a second series of slots configured to removably attach a second storage accessory of the plurality of storage accessories for storing a bucket; a third series of slots configured to removably attach a third storage accessory of the plurality of storage accessories being a first container; a fourth series of slots configured to removably attach a fourth storage accessory of the plurality of storage accessories being a second container; a fifth series of slots configured to removably attach a fifth storage accessory of the plurality of storage accessories being a retaining barrier; and a sixth series of slots configured to removably attach a sixth storage accessory of the plurality of storage accessories being a bicycle storage accessory.

12. The slidable bed liner of claim 10, wherein the plurality of storage accessories comprises at least two of the following: a first storage accessory configured to store long handled tools; a second storage accessory configured to store a bucket; a third storage accessory being a first container; a fourth storage accessory being a second container; a fifth storage accessory being a retaining barrier; and a sixth storage accessory being a bicycle storage accessory.

13. The slidable bed liner of claim 10, wherein the plurality of attachment pieces traverse through both the plurality of series of slots in the platform and the series of slots in the plurality of storage accessories to removably attach the plurality of storage accessories to the platform.

14. The slidable bed liner of claim 10, wherein each attachment piece of the plurality of attachment pieces comprises: a base having a circular, convex shape; a vertical rail extending upwards from a top surface of the base; the vertical rail configured to traverse through both a slot of the plurality of series of slots in the platform and a slot of the series of slots in the storage accessories to removably attach the plurality of storage accessories accessory to the platform.

15. The slidable bed liner of claim 14, wherein the vertical rail of each of the attachment pieces of the plurality of attachment pieces includes a locking mechanism configured to removably secure the attachment piece to the storage accessory and a retention tab configured to catch on a top surface of the platform to secure the attachment piece to the platform.

16. A method of using a slidable bed liner to transport cargo in a vehicle, comprising:

providing a vehicle having a cargo storage area;
providing cargo in need of transport;
providing a slidable bed liner, comprising:
a plurality of storage accessories;
a generally rectangular platform including a top side, a bottom side, a front end, and a rear end;
the bottom side of the platform having a coefficient of friction designed to slide along a top surface of a floor of the cargo storage area of the vehicle;
a rear flap hingedly secured to the rear end;
at least one handhold positioned on the rear flap;
a plurality of series of slots traversing through the platform;
a plurality of attachment pieces configured to removably attach the plurality of storage accessories to the platform through the paired plurality of series of slots traversing through the platform;
each series of slots of the plurality of series of slots being fixed and only corresponding with a particular storage accessory of the plurality of storage accessories as a pair;
each series of slots of the plurality of series of slots configured to removably attach a corresponding paired storage accessory of the plurality of storage accessories; and
each storage accessory of the plurality of storage accessories having a fixed series of slots traversing through a bottom surface of the storage accessory and corresponding with the paired series of slots traversing through the platform; and
wherein the slidable bed liner is designed to slide in and out of an open cargo storage area of the vehicle to facilitate the loading and unloading of the cargo;

selecting a particular storage accessory of the plurality of storage accessories depending on the cargo to be transported;

removably attaching the particular storage accessory of the plurality of storage accessories to the platform using appropriate attachment pieces of the plurality of attachment pieces;

setting the slidable bed liner in the cargo storage area of the vehicle;

loading the cargo onto the slidable bed liner using the particular storage accessory to ensure reliable securement of the cargo therein; and transporting the cargo to a destination using the vehicle.

17. The method of claim 16, wherein the plurality of attachment pieces traverse through both the series of slots in the platform and the series of slots in the plurality of storage accessories to removably attach the plurality of storage accessories to the platform.

* * * * *